(12) United States Patent
Wei et al.

(10) Patent No.: US 10,313,183 B2
(45) Date of Patent: Jun. 4, 2019

(54) NETWORK FUNCTION VIRTUALIZATION NFV FAULT MANAGEMENT APPARATUS, DEVICE, AND METHOD

(71) Applicant: Huawei Technologies Co., Ltd., Shenzhen (CN)

(72) Inventors: Anni Wei, Beijing (CN); Lei Zhu, Beijing (CN); Chunshan Xiong, Beijing (CN); Fang Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 15/197,114

(22) Filed: Jun. 29, 2016

(65) Prior Publication Data

US 2016/0315802 A1 Oct. 27, 2016

Related U.S. Application Data

(63) Continuation of application No. PCT/CN2014/071623, filed on Jan. 28, 2014.

(30) Foreign Application Priority Data

Dec. 31, 2013 (WO) ................ PCT/CN2013/091089

(51) Int. Cl.
*H04L 12/24* (2006.01)
*H04L 29/08* (2006.01)
*H04L 12/713* (2013.01)

(52) U.S. Cl.
CPC .......... *H04L 41/0686* (2013.01); *H04L 41/06* (2013.01); *H04L 41/069* (2013.01); *H04L 45/586* (2013.01); *H04L 67/26* (2013.01)

(58) Field of Classification Search
CPC ....... G06F 9/45558; G06F 2009/45595; G06F 2009/4557; H04L 67/10; H04L 41/0893
See application file for complete search history.

(56) References Cited

U.S. PATENT DOCUMENTS

| 8,023,498 | B2 | 9/2011 | Preston et al. |
| 2003/0229674 | A1 | 12/2003 | Cabrera et al. |
| 2004/0160895 | A1 | 8/2004 | Holmgren et al. |
| 2010/0057867 | A1 | 3/2010 | Yue et al. |

(Continued)

FOREIGN PATENT DOCUMENTS

| CA | 2215440 C | 12/2003 |
| CA | 2359394 C | 7/2012 |

(Continued)

OTHER PUBLICATIONS

Zheng, "The Network Fault Information Distributing System Based on CORBA Event Service," (Nov. 2003).

(Continued)

*Primary Examiner* — Jung H Park
(74) *Attorney, Agent, or Firm* — Leydig, Voit & Mayer, Ltd.

(57) ABSTRACT

A network function virtualization NFV fault management apparatus, device, and method are disclosed. The apparatus includes: a receiver, configured to receive a fault subscription message sent by at least one subscription node in an NFV system and a fault publish message sent by at least one fault publish node in the NFV system, where the fault subscription message includes fault information to which a subscription is requested; a processor, configured to perform matching between the fault information to which a subscription is requested and the fault publish message, and generate a fault notification message; and a transmitter, configured to notify the fault notification message to the at least one subscription node. According to the present invention, real-time and quick location and notification of node fault information can be implemented.

16 Claims, 10 Drawing Sheets

(56) References Cited

U.S. PATENT DOCUMENTS

| | | |
|---|---|---|
| 2010/0333111 A1 | 12/2010 | Kothamasu et al. |
| 2011/0258268 A1 | 10/2011 | Banks et al. |
| 2013/0298192 A1 | 11/2013 | Kumar et al. |
| 2013/0303114 A1* | 11/2013 | Ahmad ............... H04W 16/14 455/406 |
| 2014/0201374 A1* | 7/2014 | Ashwood-Smith ..... H04L 49/70 709/226 |
| 2015/0089331 A1* | 3/2015 | Skerry ............... G06F 9/45533 714/799 |
| 2015/0178117 A1* | 6/2015 | Ryu ................... G06F 9/45558 718/1 |
| 2015/0180730 A1* | 6/2015 | Felstaine ............. H04L 41/022 709/225 |
| 2017/0078216 A1* | 3/2017 | Adolph .............. H04L 12/4641 |

FOREIGN PATENT DOCUMENTS

| | | |
|---|---|---|
| CN | 1509000 A | 6/2004 |
| CN | 1852153 A | 10/2006 |
| CN | 101159710 A | 4/2008 |
| CN | 101355445 A | 1/2009 |
| CN | 101562548 A | 10/2009 |
| CN | 101668031 A | 3/2010 |
| CN | 101945056 A | 6/2010 |
| CN | 101938365 A | 1/2011 |
| CN | 102859541 A | 1/2013 |
| CN | 103457770 A | 12/2013 |
| JP | 2012513707 A | 6/2012 |
| WO | 2010074630 A1 | 7/2010 |

OTHER PUBLICATIONS

"3rd Generation Partnership Project; Technical Specification Group Services and System Aspects; Telecommunication management; Configuration Management (CM); Name convention for Managed Objects (Release 11)," 3GPP TS 32.300 V11.2.0, pp. 1-27, 3rd Generation Partnership Project, Valbonne, France (Jun. 2013).

* cited by examiner

NETWORK FUNCTION VIRTUALIZATION NFV FAULT MANAGEMENT APPARATUS, DEVICE, AND METHOD

CROSS-REFERENCE

This application is a continuation of International Application No. PCT/CN2014/071623, filed on Jan. 28, 2014, which claims priority to international Patent Application No. PCT/CN2013/091089, filed on Dec. 31, 2013, both of which are hereby incorporated by reference in their entireties.

TECHNICAL FIELD

Embodiments of the invention relate to the field of virtualization technologies, and in particular, to a network function virtualization NFV fault management apparatus, device, and method.

BACKGROUND

An objective of putting forward network function virtualization (NFV) is to implement some network functions in a universal high-performance server, switch, and memory by employing a virtualization technology in information technologies, which requires that the network functions be implemented in a software manner, run on universal server hardware, and be migrated, instantiated, and deployed at different locations of a network as required, and does not require installation of a new device. In a schematic diagram of a comparison between a typical network application manner and a network function virtualization NFV manner shown in FIG. 1, various types of network devices, such as a server, a router, a storage device, for example, a content delivery network (CDN), and a switch, may all implement separation between software and hardware by using a network function virtualization technology, and may be deployed in a data center, a network node, or a home of a user.

In an architectural diagram of an NFV system shown in FIG. 2, one NFV system includes multiple nodes, such as a virtualized network function (VNF), an element management system (EMS), NFV infrastructure (NFVI), a virtualized infrastructure manager (VIM), an NFV orchestrator (NFVO), a VNF manager (VNFM), a service, VNF and infrastructure description apparatus, an operation support system (OSS)/business support system (BSS), and interfaces between nodes, such as an interface Vn-Nf between the VNF and the NFVI, an interface VI-Ha between a virtualization layer and a hardware resource, an interface Or-Vnfm between the Orchestrator and the VNF Manager, an interface Vi-Vnfm between the VIM and the VNFM, an interface Or-Vi between the NFVO and the VIM, an interface Nf-Vi between the NFVI and the VIM, an interface Os-Ma between the OSS/BSS and the NFVO, an interface Ve-Vnfm between the VNF/EMS and the VNFM, and an interface Se-Ma between the service, VNF and infrastructure description apparatus and the NFVO.

When the nodes are running, a fault may be generated, and some nodes need to notify the fault to some other nodes. Two NFV fault notification mechanisms are discussed currently. A first mechanism is that when a fault occurs on NFVI, the fault is directly published to a VNF. A second mechanism is that when a fault occurs on NFVI, the fault is notified to a VNFM by using a VIM, and is then notified to a VNF by using the VNFM. However, in a complex environment of the NFV system, node levels are numerous, and a fault may occur on any level of a VNF. According to the first mechanism provided in the prior art, it is relatively difficult to implement cross-level publishing of fault information; according to the second mechanism, the fault is notified to the VNFM by using the VIM, and is then notified to the VNF by using the VNFM, and a relatively large delay is caused by performing publishing level by level.

To sum up, in a complex architecture of the NFV system, how to implement real-time and quick location and notification of node fault information is a problem that needs to be resolved currently and urgently.

SUMMARY

Embodiments of the present invention provide a network function virtualization NFV fault management apparatus, device, and method, which can implement real-time and quick location and notification of node fault information.

According to a first aspect, a network function virtualization NFV fault management apparatus is provided, including:

a first receiving unit, configured to receive a fault subscription message sent by at least one subscription node in an NFV system, where the fault subscription message includes: a node identifier of the at least one subscription node and fault information to which a subscription is requested;

a second receiving unit, configured to receive a fault publish message sent by at least one fault publish node in the NFV system;

a matching unit, configured to perform matching between the fault information to which a subscription is requested and the fault publish message, and generate a fault notification message; and a notification unit, configured to notify the fault notification message to a corresponding subscription node associated with the node identifier of the at least one subscription node.

In a first possible implementation manner, the fault information to which a subscription is requested and the fault publish message include: a grouping identifier of the fault publish node, a node identifier of the fault publish node, a fault type, and/or fault content, and/or a fault priority.

With reference to the first possible implementation manner of the first aspect, in a second possible implementation manner, the notification unit is specifically configured to successively notify, according to the fault priority, the fault notification message to the corresponding subscription node associated with the node identifier of the at least one subscription node.

With reference to the first aspect or the first possible implementation manner of the first aspect, in a third possible implementation manner, the notification unit is specifically configured to: when fault types and/or fault content to which a subscription is requested by at least two subscription nodes are/is the same, simultaneously notify the fault notification message to corresponding subscription nodes associated with node identifiers of the at least two subscription nodes.

With reference to the first aspect, the first possible implementation manner of the first aspect, the second possible implementation manner of the first aspect, or the third possible implementation manner of the first aspect, in a fourth possible implementation manner, the apparatus further includes:

a storage unit, configured to associatively store the fault subscription message, the fault publish message, and/or the fault notification message.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, the apparatus further includes:

an acquiring unit, configured to acquire a correspondence between an identifier of at least one virtualized network function VNF node and an identifier of at least one network function virtualization infrastructure NFVI node from a network function virtualization orchestrator NFVO.

With reference to the fifth possible implementation manner of the first aspect, in a sixth possible implementation manner, the first receiving unit is specifically configured to receive a fault subscription message, which is sent by the at least one subscription node in the NFV system, for requesting to subscribe to fault information of the at least one NFVI fault publish node.

With reference to the fifth possible implementation manner of the first aspect or the sixth possible implementation manner of the first aspect, in a seventh possible implementation manner, the matching unit is specifically configured to: after a fault subscription message of the at least one VNF subscription node and a fault publish message of the at least one NFVI fault publish node are received, perform matching between fault information to which a subscription is requested by the at least one VNF subscription node and the fault publish message of the at least one NFVI fault publish node according to the correspondence, and generate the fault notification message.

With reference to the fifth possible implementation manner of the first aspect or the sixth possible implementation manner of the first aspect, in an eighth possible implementation manner, the matching unit is specifically configured to: after a fault subscription message of the at least one VNF subscription node and a fault publish message of at least one hardware resource node or virtualization management program hypervisor or virtual machine Virtual Machine in the NFVI are received, perform matching between fault information to which a subscription is requested by the at least one VNF subscription node and the fault publish message of the at least one hardware resource node or virtualization management program or virtual machine according to the correspondence, and generate the fault notification message, where the apparatus is located in any virtual resource node in the NFVI, and the virtual resource node includes the virtual machine and/or the virtualization management program.

According to a second aspect, a network function virtualization NFV node is provided, including:

a first sending unit, configured to send, to an NFV fault management apparatus, a fault subscription message that carries a node identifier and fault information to which a subscription is requested, so that the NFV fault management apparatus performs matching between the fault information to which a subscription is requested and a fault publish message that is sent by a fault publish node and that corresponds to the fault subscription message, and generates a fault notification message; and a third receiving unit, configured to receive the fault notification message that is sent by the NFV fault management apparatus according to the node identifier.

In a first possible implementation manner, the fault information to which a subscription is requested and the fault publish message include: a grouping identifier of the fault publish node, a node identifier of the fault publish node, a fault type, and/or fault content, and/or a fault priority.

With reference to the second aspect or the first possible implementation manner of the second aspect, in a second possible implementation manner, the NFV node is a virtualized network function VNF node, and the first sending unit is specifically configured to send, to the NFV fault management apparatus, a fault subscription message, which carries the node identifier of the VNF node, for requesting to subscribe to fault information of at least one network function virtualization infrastructure NFVI fault publish node, so that the NFV fault management apparatus performs, according to a correspondence between the node identifier of the VNF node and a node identifier of the at least one NFVI node, matching between the fault information, to which a subscription is requested, of the at least one NFVI node and a fault publish message sent by the at least one NFVI node, and generates the fault notification message.

With reference to the second possible implementation manner of the second aspect, in a third possible implementation manner, the first sending unit is specifically configured to send, to the NFV fault management apparatus, a fault subscription message, which carries the node identifier of the VNF node, for requesting to subscribe to fault information of at least one hardware resource node or virtualization management program hypervisor or virtual machine Virtual Machine in the NFVI, so that the NFV fault management apparatus performs, according to a correspondence between the node identifier of the VNF node and a node identifier of the at least one hardware resource node or virtualization management program or virtual machine, matching between the fault information, to which a subscription is requested, of the at least one hardware resource node or virtualization management program or virtual machine and a fault publish message sent by the at least one hardware resource node or virtualization management program or virtual machine, and generates the fault notification message, where the NFV fault management apparatus is located in any virtual resource node in the NFVI, and the virtual resource node includes the virtualization management program and/or the virtual machine.

According to a third aspect, a network function virtualization NFV node is provided, including:

a second sending unit, configured to send a fault publish message to an NFV fault management apparatus, so that the NFV fault management apparatus performs matching between fault information to which a subscription is requested and that is received from a subscription node and the fault publish message, generates a fault notification message, and notifies the fault notification message to the subscription node.

In a first possible implementation manner, the fault information to which a subscription is requested and the fault publish message include: a grouping identifier of a fault publish node, a node identifier of the fault publish node, a fault type, and/or fault content, and/or a fault priority.

According to a fourth aspect, a network function virtualization NFV fault management device is provided, including an input apparatus, an output apparatus, a memory, and a processor, where the processor is configured to perform the following steps:

receiving a fault subscription message sent by at least one subscription node in an NFV system, where the fault subscription message includes: a node identifier of the at least one subscription node and fault information to which a subscription is requested;

receiving a fault publish message sent by at least one fault publish node in the NFV system;

performing matching between the fault information to which a subscription is requested and the fault publish message, and generating a fault notification message; and notifying the fault notification message to a corresponding subscription node associated with the node identifier of the at least one subscription node.

In a first possible implementation manner, the fault information to which a subscription is requested and the fault publish message include: a grouping identifier of the fault publish node, a node identifier of the fault publish node, a fault type, and/or fault content, and/or a fault priority.

With reference to the first possible implementation manner of the fourth aspect, in a second possible implementation manner, that the processor performs the step of notifying the fault notification message to a corresponding subscription node associated with the node identifier of the at least one subscription node is specifically:

successively notifying, according to the fault priority, the fault notification message to the subscription node associated with the node identifier of the at least one subscription node.

With reference to the fourth aspect or the first possible implementation manner of the fourth aspect, in a third possible implementation manner, that the processor performs the step of notifying the fault notification message to a corresponding subscription node associated with the node identifier of the at least one subscription node is specifically:

when fault types and/or fault content to which a subscription is requested by at least two subscription nodes are/is the same, simultaneously notifying the fault notification message to corresponding subscription nodes associated with node identifiers of the at least two subscription nodes.

With reference to the fourth aspect, the first possible implementation manner of the fourth aspect, the second possible implementation manner of the fourth aspect, or the third possible implementation manner of the fourth aspect, in a fourth possible implementation manner, the processor is further configured to perform the following step:

associatively storing the fault subscription message, the fault publish message, and/or the fault notification message.

With reference to the fourth aspect, the first possible implementation manner of the fourth aspect, the second possible implementation manner of the fourth aspect, the third possible implementation manner of the fourth aspect, or the fourth possible implementation manner of the fourth aspect, in a fifth possible implementation manner, the processor is further configured to perform the following step:

acquiring a correspondence between an identifier of at least one virtualized network function VNF node and an identifier of at least one network function virtualization infrastructure NFVI node from a network function virtualization orchestrator NFVO.

With reference to the fifth possible implementation manner of the fourth aspect, in a sixth possible implementation manner, that the processor performs the step of receiving a fault subscription message sent by at least one subscription node in an NFV system is specifically:

receiving a fault subscription message, which is sent by the at least one subscription node in the NFV system, for requesting to subscribe to fault information of the at least one NFVI fault publish node.

With reference to the fifth possible implementation manner of the fourth aspect or the sixth possible implementation manner of the fourth aspect, in a seventh possible implementation manner, that the processor performs the step of notifying the fault notification message to a corresponding subscription node associated with the node identifier of the at least one subscription node is specifically:

after a fault subscription message of the at least one VNF subscription node and a fault publish message of the at least one NFVI fault publish node are received, performing matching between fault information to which a subscription is requested by the at least one VNF subscription node and the fault publish message of the at least one NFVI fault publish node according to the correspondence, and generating the fault notification message.

With reference to the fifth possible implementation manner of the fourth aspect or the sixth possible implementation manner of the fourth aspect, in an eighth possible implementation manner, that the processor performs the step of performing matching between the fault information to which a subscription is requested and the fault publish message, and generating a fault notification message is specifically:

after a fault subscription message of the at least one VNF subscription node and a fault publish message of at least one hardware resource node or virtualization management program hypervisor or virtual machine Virtual Machine in the NFVI are received, performing matching between fault information to which a subscription is requested by the at least one VNF subscription node and the fault publish message of the at least one hardware resource node or virtualization management program or virtual machine according to the correspondence, and generating the fault notification message, where the device is located in any virtual resource node in the NFVI, and the virtual resource node includes the virtualization management program and/or the virtual machine.

According to a fifth aspect, a network function virtualization NFV node device is provided, including an input apparatus, an output apparatus, a memory, and a processor, where the processor is configured to perform the following steps:

sending, to an NFV fault management apparatus, a fault subscription message that carries a node identifier and fault information to which a subscription is requested, so that the NFV fault management apparatus performs matching between the fault information to which a subscription is requested and a fault publish message that is sent by a fault publish node and that corresponds to the fault subscription message, and generates a fault notification message; and receiving the fault notification message that is sent by the NFV fault management apparatus according to the node identifier.

In a first possible implementation manner, the fault information to which a subscription is requested and the fault publish message include: a grouping identifier of the fault publish node, a node identifier of the fault publish node, a fault type, and/or fault content, and/or a fault priority.

With reference to the fifth aspect or the first possible implementation manner of the fifth aspect, in a second possible implementation manner, the NFV node device is a virtualized network function VNF node; and that the processor performs the step of sending, to an NFV fault management apparatus, a fault subscription message that carries a node identifier and fault information to which a subscription is requested, so that the NFV fault management apparatus performs matching between the fault information to which a subscription is requested and a fault publish message that is sent by a fault publish node and that corresponds to the fault subscription message, and generates a fault notification message is specifically:

sending, to the NFV fault management apparatus, a fault subscription message, which carries the node identifier of the VNF node, for requesting to subscribe to fault information of at least one network function virtualization infrastructure NFVI fault publish node, so that the NFV fault management apparatus performs, according to a correspondence between the node identifier of the VNF node and a node identifier of the at least one NFVI node, matching between the fault information, to which a subscription is requested, of the at least one NFVI node and a fault publish message sent by the at least one NFVI node, and generates the fault notification message.

With reference to the second possible implementation manner of the fifth aspect, in a third possible implementation manner, that the processor performs the step of sending, to an NFV fault management apparatus, a fault subscription message that carries a node identifier and fault information to which a subscription is requested, so that the NFV fault management apparatus performs matching between the fault information to which a subscription is requested and a fault publish message that is sent by a fault publish node and that corresponds to the fault subscription message, and generates a fault notification message is specifically:

sending, to the NFV fault management apparatus, a fault subscription message, which carries the node identifier of the VNF node, for requesting to subscribe to fault information of at least one hardware resource node or virtualization management program hypervisor or virtual machine Virtual Machine in the NFVI, so that the NFV fault management apparatus performs, according to a correspondence between the node identifier of the VNF node and a node identifier of the at least one hardware resource node or virtualization management program or virtual machine, matching between the fault information, to which a subscription is requested, of the at least one hardware resource node or virtualization management program or virtual machine and a fault publish message sent by the at least one hardware resource node or virtualization management program or virtual machine, and generates the fault notification message, where the NFV fault management apparatus is located in any virtual resource node in the NFVI, and the virtual resource node includes the virtualization management program and/or the virtual machine.

According to a sixth aspect, a network function virtualization NFV node device is provided, including an input apparatus, an output apparatus, a memory, and a processor, where the processor is configured to perform the following step:

sending a fault publish message to an NFV fault management apparatus, so that the NFV fault management apparatus performs matching between fault information to which a subscription is requested and that is received from a subscription node and the fault publish message, generates a fault notification message, and notifies the fault notification message to the subscription node.

In a first possible implementation manner, the fault information to which a subscription is requested and the fault publish message include: a grouping identifier of a fault publish node, a node identifier of the fault publish node, a fault type, and/or fault content, and/or a fault priority.

According to a seventh aspect, a network function virtualization NFV fault management method is provided, including:

receiving a fault subscription message sent by at least one subscription node in an NFV system, where the fault subscription message includes: a node identifier of the at least one subscription node and fault information to which a subscription is requested;

receiving a fault publish message sent by at least one fault publish node in the NFV system;

performing matching between the fault information to which a subscription is requested and the fault publish message, and generating a fault notification message; and notifying the fault notification message to a corresponding subscription node associated with the node identifier of the at least one subscription node.

In a first possible implementation manner, the fault information to which a subscription is requested and the fault publish message include: a grouping identifier of the fault publish node, a node identifier of the fault publish node, a fault type, and/or fault content, and/or a fault priority.

With reference to the first possible implementation manner of the seventh aspect, in a second possible implementation manner, the notifying the fault notification message to a corresponding subscription node associated with the node identifier of the at least one subscription node is specifically:

successively notifying, according to the fault priority, the fault notification message to the subscription node associated with the node identifier of the at least one subscription node.

With reference to the seventh aspect or the first possible implementation manner of the seventh aspect, in a third possible implementation manner, the notifying the fault notification message to a corresponding subscription node associated with the node identifier of the at least one subscription node is specifically:

when fault types and/or fault content to which a subscription is requested by at least two subscription nodes are/is the same, simultaneously notifying the fault notification message to corresponding subscription nodes associated with node identifiers of the at least two subscription nodes.

With reference to the seventh aspect, the first possible implementation manner of the seventh aspect, the second possible implementation manner of the seventh aspect, or the third possible implementation manner of the seventh aspect, in a fourth possible implementation manner, the method further includes:

associatively storing the fault subscription message, the fault publish message, and/or the fault notification message.

With reference to the seventh aspect, the first possible implementation manner of the seventh aspect, the second possible implementation manner of the seventh aspect, the third possible implementation manner of the seventh aspect, or the fourth possible implementation manner of the seventh aspect, in a fifth possible implementation manner, the method further includes:

acquiring a correspondence between an identifier of at least one virtualized network function VNF node and an identifier of at least one network function virtualization infrastructure NFVI node from a network function virtualization orchestrator NFVO.

With reference to the fifth possible implementation manner of the seventh aspect, in a sixth possible implementation manner, the receiving a fault subscription message sent by at least one subscription node in an NFV system is specifically:

receiving a fault subscription message, which is sent by the at least one subscription node in the NFV system, for requesting to subscribe to fault information of the at least one NFVI fault publish node.

With reference to the fifth possible implementation manner of the seventh aspect or the sixth possible implementation manner of the seventh aspect, in a seventh possible implementation manner, the notifying the fault notification message to a corresponding subscription node associated with the node identifier of the at least one subscription node is specifically:

after a fault subscription message of the at least one VNF subscription node and a fault publish message of the at least one NFVI fault publish node are received, performing matching between fault information to which a subscription is requested by the at least one VNF subscription node and the fault publish message of the at least one NFVI fault publish node according to the correspondence, and generating the fault notification message.

With reference to the fifth possible implementation manner of the seventh aspect or the sixth possible implementation manner of the seventh aspect, in an eighth possible implementation manner, the performing matching between the fault information to which a subscription is requested and the fault publish message, and generating a fault notification message is specifically:

after a fault subscription message of the at least one VNF subscription node and a fault publish message of at least one hardware resource node or virtualization management program hypervisor or virtual machine Virtual Machine in the NFVI are received, performing matching between fault information to which a subscription is requested by the at least one VNF subscription node and the fault publish message of the at least one hardware resource node or virtualization management program or virtual machine according to the correspondence, and generating the fault notification message.

According to an eighth aspect, a network function virtualization NFV fault management method is provided, including:

sending, to an NFV fault management apparatus, a fault subscription message that carries a node identifier and fault information to which a subscription is requested, so that the NFV fault management apparatus performs matching between the fault information to which a subscription is requested and a fault publish message that is sent by a fault publish node and that corresponds to the fault subscription message, and generates a fault notification message; and receiving the fault notification message that is sent by the NFV fault management apparatus according to the node identifier.

In a first possible implementation manner, the fault information to which a subscription is requested and the fault publish message include: a grouping identifier of the fault publish node, a node identifier of the fault publish node, a fault type, and/or fault content, and/or a fault priority.

With reference to the eighth aspect or the first possible implementation manner of the eighth aspect, in a second possible implementation manner, the sending, to an NFV fault management apparatus, a fault subscription message that carries a node identifier and fault information to which a subscription is requested, so that the NFV fault management apparatus performs matching between the fault information to which a subscription is requested and a fault publish message that is sent by a fault publish node and that corresponds to the fault subscription message, and generates a fault notification message is specifically:

sending, to the NFV fault management apparatus, a fault subscription message, which carries a node identifier of a VNF node, for requesting to subscribe to fault information of at least one network function virtualization infrastructure NFVI fault publish node, so that the NFV fault management apparatus performs, according to a correspondence between the node identifier of the VNF node and a node identifier of the at least one NFVI node, matching between the fault information, to which a subscription is requested, of the at least one NFVI node and a fault publish message sent by the at least one NFVI node, and generates the fault notification message.

With reference to the second possible implementation manner of the eighth aspect, in a third possible implementation manner, the sending, to an NFV fault management apparatus, a fault subscription message that carries a node identifier and fault information to which a subscription is requested, so that the NFV fault management apparatus performs matching between the fault information to which a subscription is requested and a fault publish message that is sent by a fault publish node and that corresponds to the fault subscription message, and generates a fault notification message is specifically:

sending, to the NFV fault management apparatus, a fault subscription message, which carries the node identifier of the VNF node, for requesting to subscribe to fault information of at least one hardware resource node or virtualization management program hypervisor or virtual machine Virtual Machine in the NFVI, so that the NFV fault management apparatus performs, according to a correspondence between the node identifier of the VNF node and a node identifier of the at least one hardware resource node or virtualization management program or virtual machine, matching between the fault information, to which a subscription is requested, of the at least one hardware resource node or virtualization management program or virtual machine and a fault publish message sent by the at least one hardware resource node or virtualization management program or virtual machine, and generates the fault notification message, where the NFV fault management apparatus is located in any virtual resource node in the NFVI, and the virtual resource node includes the virtualization management program and/or the virtual machine.

According to a ninth aspect, a network function virtualization NFV fault management method is provided, including:

sending a fault publish message to an NFV fault management apparatus, so that the NFV fault management apparatus performs matching between fault information to which a subscription is requested and that is received from a subscription node and the fault publish message, generates a fault notification message, and notifies the fault notification message to the subscription node.

In a first possible implementation manner, the fault information to which a subscription is requested and the fault publish message include: a grouping identifier of a fault publish node, a node identifier of the fault publish node, a fault type, and/or fault content, and/or a fault priority.

According to the technical solutions of the network function virtualization NFV fault management apparatus, device, and method that are provided in the embodiments of the present invention, the NFV fault management apparatus disposed in an NFV system centrally receives a fault subscription message and a fault publish message of any node in the NFV system, performs matching between parameters of the received fault subscription message and fault publish message, and notifies a fault notification message to a corresponding node, which can implement real-time and quick location and notification of node fault information.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
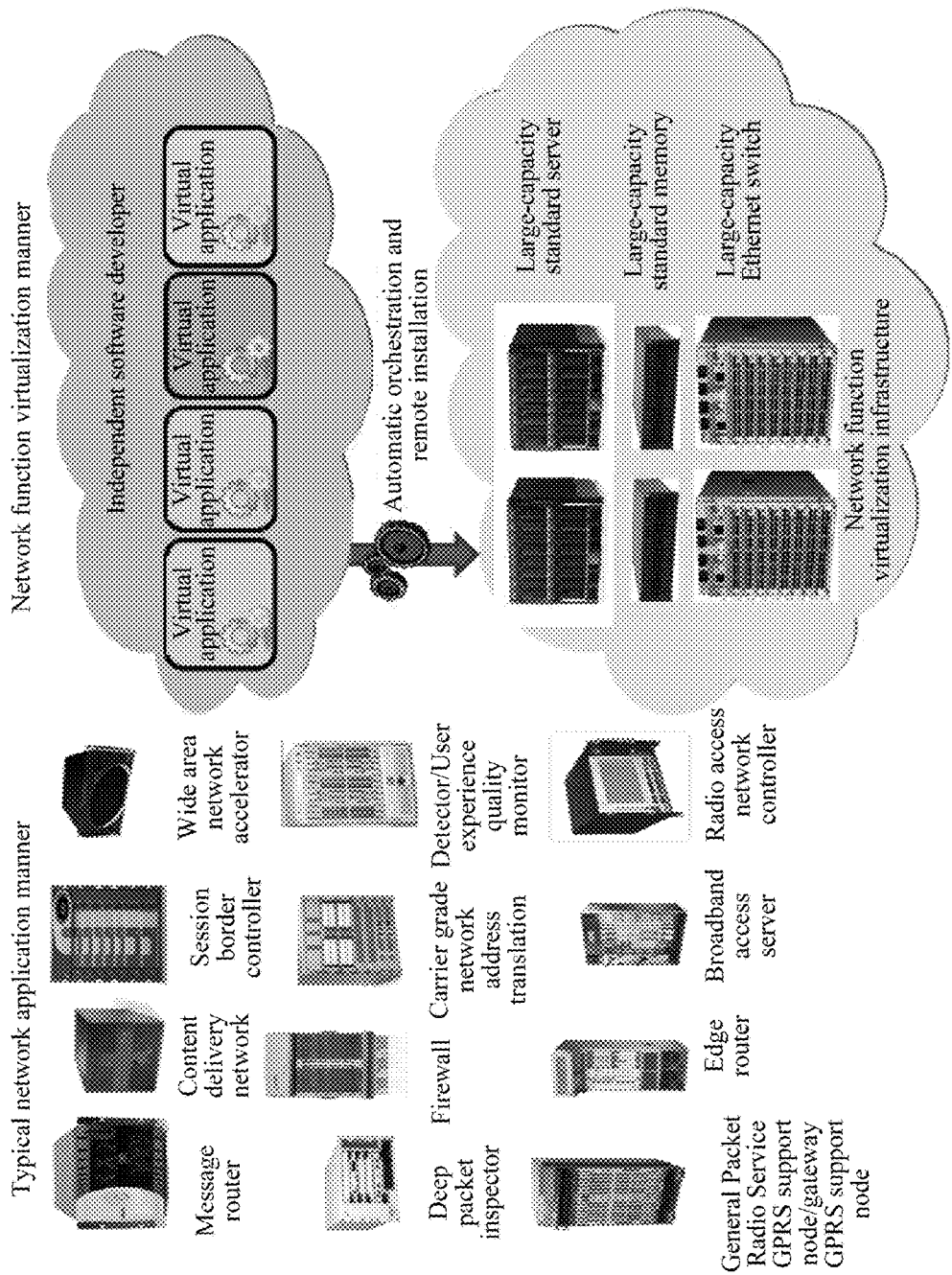
FIG. 1 is a schematic diagram of a comparison between a typical network application manner and a network function virtualization NFV manner.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the embodiments of the present invention, an NFV fault management apparatus is added to an NFV network architecture, and the apparatus may be a server or the like. In an NFV system, the NFV fault management apparatus may receive fault subscription messages of any one or more nodes and fault publish messages of any one or more nodes, then perform matching between the received fault subscription messages and fault publish messages, and notify fault messages that are successfully matched to a corresponding fault subscription node, which can implement quicker, simpler, and more convenient location and notification of a fault. This fault management architecture also has relatively good performance and scalability, for example, a new node may flexibly enter into or leave the fault management architecture, and it is more convenient to configure a newly added fault message type.

In the NFV system, meanings of nodes and interfaces are as follows:

(1) A VNF: corresponds to a physical network function (Physical Network Function, PNF), for example, a virtualized evolved packet core (EPC) network node (such as a mobility management entity (MME), a serving gateway (SGW), or a packet data network-gateway (PGW)), in a conventional non-virtualized network. A functional behavior and status of a network function are unrelated to virtualization, and in NFV, it is intended that the VNF and the PNF have a same functional behavior and external interface.

A VNF may include multiple components of a lower level. Therefore, one VNF may be deployed on multiple VMs, and each virtual machine (VM) carries one VNF component; and the VNF may also be deployed on one VM.

(2) An EMS: performs a conventional fault management, configuration management, accounting management, performance management, security management (FCAPS) function for a VNF.

(3) NFV Infrastructure: includes a hardware resource, a virtual resource, and a virtualization layer. From the perspective of a VNF, the virtualization layer and the hardware resource are considered as one entity that can provide a required virtual resource.

(4) A Virtualized Infrastructure Manager or Virtualized Infrastructure Managers: include(s) an entity that is configured to control and manage computing, storage and network resources, and virtualization thereof.

(5) An Orchestrator: is responsible for orchestrating and managing NFV resources (including infrastructure and a software resource) on a network side, and implementing an NFV service topology on NFVI.

(6) A VNF Manager or VNF Managers: is/are responsible for managing a life cycle of a VNF instance.

(7) A Service, VNF and Infrastructure Description: provides information about a connection to a VNF, service related information, a VNF information model, and an NFVI information model.

(8) Operation and Business Support Systems (OSS/BSS): refer to an existing OSS/BSS of an operator.

The Orchestrator, the VNF Manager, and the Virtualized Infrastructure Manager form an NFVO together.

Interfaces in the architecture include:

(1) An interface VI-Ha between a virtualization layer and a hardware resource: the virtualization layer may request the hardware resource and collect related hardware resource status information by using the interface.

(2) An interface Vn-Nf between a VNF and NFVI: describes an execution environment that is provided by the NFVI to the VNF.

(3) An interface Or-Vnfm between the Orchestrator and the VNF Manager: an internal interface of the NFVO is used in the following cases:

the VNF Manager sends a resource related request, such as authorization, verification, reservation, and allocation of a resource, and is configured to manage a life cycle of the VNF; and the Orchestrator sends configuration information to the VNF manager, so that the VNF can be properly configured according to a forwarding graph of the VNF; and collects status information of the VNF, where the status information is used to manage the life cycle of the VNF.

(4) An interface Vi-Vnfm between the Virtualized Infrastructure Manager and the VNF Manager: an internal interface of the NFVO is used in the following cases:
the VNF Manager sends a resource allocation request; and
a virtual hardware resource is configured and status information (for example, an event) is exchanged.
(5) An interface Or-Vi between the Orchestrator and the Virtualized Infrastructure Manager: an internal interface of the NFVO is used in the following cases:
the Orchestrator sends a resource reservation request;
the Orchestrator sends a resource allocation request; and
a virtual hardware resource is configured and status information (for example, an event) is exchanged.
(6) An interface Nf-Vi between the NFVI and the Virtualized Infrastructure Manager:
performs specific resource allocation according to a resource allocation request; and
forwards virtual resource status information; and
a virtual hardware resource is configured and status information (for example, an event) is exchanged.
(7) An interface Os-Ma between the OSS/BSS and the NFVO:
requests to manage a life cycle of a service graph;
requests to manage the life cycle of the VNF;
forwards NFV related status information;
exchanges policy management information;
exchanges data analysis information;
forwards accounting and usage records that are related to the NFV; and
exchanges information about a capacity and an inventory.
(8) An interface Ve-Vnfm between the VNF/EMS and the VNF Manager:
requests to manage the life cycle of the VNF;
exchanges configuration information; and
exchanges status information necessary for managing a life cycle of a service.
(9) An interface Se-Ma between the Service, VNF and Infrastructure Description and the NFVO: is configured to search for information related to a forwarding graph of the VNF, service related information, VNF related information, and information related to an NFVI information model, where the information is provided to the NFVO for using.

Figure 3:
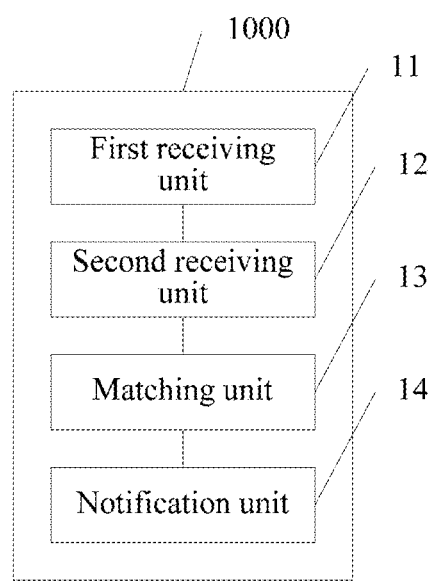
FIG. 3 is a schematic structural diagram of an NFV fault management apparatus according to an embodiment of the present invention.

Refer to FIG. 3, which is a schematic structural diagram of an NFV fault management apparatus according to an embodiment of the present invention. The apparatus 1000 includes: a first receiving unit 11, a second receiving unit 12, a matching unit 13, and a notification unit 14.

The first receiving unit 11 is configured to receive a fault subscription message sent by at least one subscription node in an NFV system, where the fault subscription message includes: a node identifier of the at least one subscription node and fault information to which a subscription is requested.

In the NFV system, each node may subscribe to fault information of other nodes from an NFV fault management apparatus, these subscription nodes may be a VNF, an EMS, NFVI, a VIM, an NFVO, a VNFM, an OSS/BSS, and the like, and each subscription node may subscribe to fault information published by one or more fault publish nodes. A subscription node sends the fault subscription message to the NFV fault management apparatus, where the fault subscription message includes: a node identifier of the subscription node and fault information to which a subscription is requested, the node identifier of the subscription node is used to uniquely identify one subscription node, and the fault information to which a subscription is requested may include: a grouping identifier of a fault publish node, a node identifier of the fault publish node, a fault type, and/or fault content, and/or a fault priority, and may further include a fault expiration time. While subscribing to the fault message, the subscription node activates a fault message receiving function of the subscription node, so as to receive fault information notified by the NFV fault management apparatus.

If the node does not need to subscribe to some type of fault information, the node may also send fault information unsubscribe "Fault Message Unsubscribe" to the NFV fault management apparatus. In an exemplary schematic flowchart of subscribing to, publishing, and notifying fault information shown in FIG. 4, a node VIM having a subscription node identifier of ID1 sends a "Fault Message Unsubscribe" message having a grouping identifier of a fault publish node of a group 1, a node identifier of the fault publish node of ID3, a fault type of A1, and fault content of A2 to the NFV fault management apparatus, and a node NFVO having a subscription node identifier of ID4 sends a "Fault Message Unsubscribe" message having a grouping identifier of the fault publish node of a group 1, a node identifier of the fault publish node of ID3, a fault type of B1, and fault content of C2 to the NFV fault management apparatus, so as to unsubscribe to the fault message and deactivate a fault receiving function of the node.

Definitions of main parameter information carried in the fault subscription message are as follows:

Grouping identifier Group of a fault publish node: a group in which the fault publish node is located, where a specific grouping rule is not limited in this embodiment of the present invention. For example, all VNFs for one network service may be used as a group, and a subscription node generally subscribes to fault information published by a fault publish node of a group that the subscription node is located. A definition of a network service in NFV refers to: including multiple VNFs or multiple VNFs and physical network functions (PNF), so as to provide a more complex function. For example, an evolved packet core network (EPC) including a virtual or physical MME, PGW/SGW, and home subscriber server (HSS), and virtual links between them can be referred to as a network Service.

Node identifier Node ID of a fault publish node: the node identifier of the fault publish node is generally used to identify and locate a publisher of fault information, that is, the node identifier indirectly provides fault location information.

Fault type/content: specific fault information includes a fault type and fault content.

Fault priority: an identifier of an emergency and importance degree of a fault.

Fault expiration time: a valid time for subscribing to fault information. This is an optional parameter whose usage is as follows: for example, 3600 s indicates that a subscription node subscribes to a fault message in 3600 s after sending the fault subscription message, and the fault subscription message is obsolete out of 3600 s; or for example, 20:00 to 22:00 indicates that the subscription node subscribes to a fault message in this period of time, and the fault subscription message is obsolete out of the period of time.

The first receiving unit 11 in the NFV fault management apparatus 1000 receives a fault subscription message sent by any subscription node in the NFV system.

Figure 4:
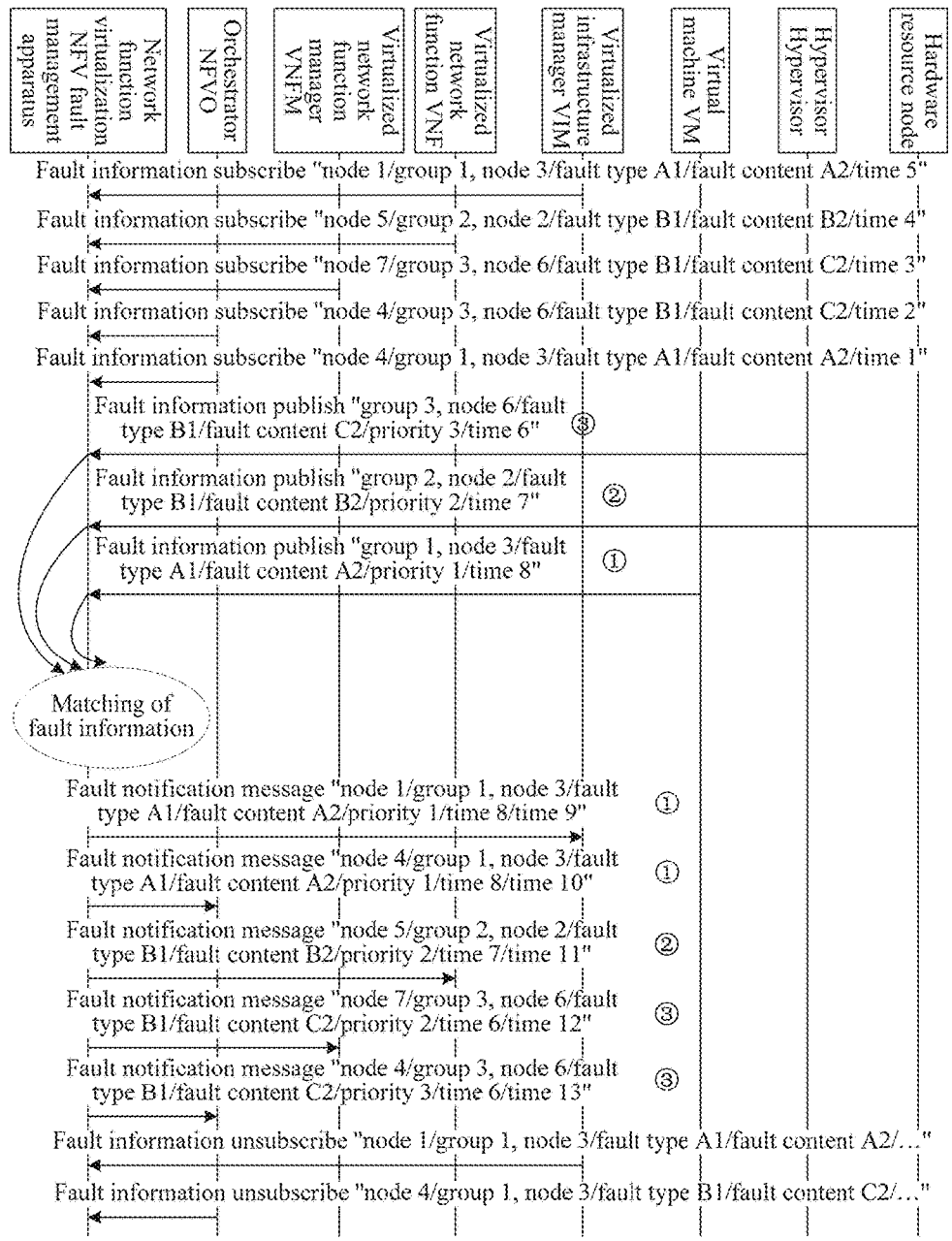
FIG. 4 is an exemplary schematic flowchart of subscribing to, publishing, and notifying fault information.

As shown in FIG. 4, the subscription node NFVO having a node identifier of the subscription node of ID4 subscribes to, from the NFV fault management apparatus, fault information having a grouping identifier of a fault publish node of a group 1, a node identifier of the fault publish node of ID3, a fault type of A1, fault content of A2, and a fault expiration time of a time 1, and fault information having a grouping identifier of a fault publish node of a group 3, a node identifier of the fault publish node of ID6, a fault type of B1, fault content of C2, and a fault expiration time of a time 2; a subscription node VNFM having a node identifier of the subscription node of ID7 subscribes to, from the NFV fault management apparatus, fault information having a grouping identifier of a fault publish node of a group 3, a node identifier of the fault publish node of ID6, a fault type of B1, fault content of C2, and a fault expiration time of a time 3; a subscription node VNF having a node identifier of the subscription node of ID5 subscribes to, from the NFV fault management apparatus, fault information having a grouping identifier of a fault publish node of a group 2, a node identifier of the fault publish node of ID2, a fault type of B1, fault content of B2, and a fault expiration time of a time 4; a subscription node VIM having a node identifier of the subscription node of ID1 subscribes to, from the NFV fault management apparatus, fault information having a grouping identifier of a fault publish node of a group 1, a node identifier of the fault publish node of ID3, a fault type of A1, fault content of A2, and a fault expiration time of a time 5.

The second receiving unit 12 is configured to receive a fault publish message sent by at least one fault publish node in the NFV system.

In the NFV system, each node may also send the fault publish message to the NFV fault management apparatus 1000, and the second receiving unit 12 of the NFV fault management apparatus 1000 receives the fault publish message sent by any node in the NFV system, where the fault publish message includes: a grouping identifier of the fault publish node, a node identifier of the fault publish node, a fault type, and/or fault content, and/or a fault priority. Meanings of the parameters are the same as those of the parameters described above. The fault publish message may further include a fault occurrence time.

Figure 2:
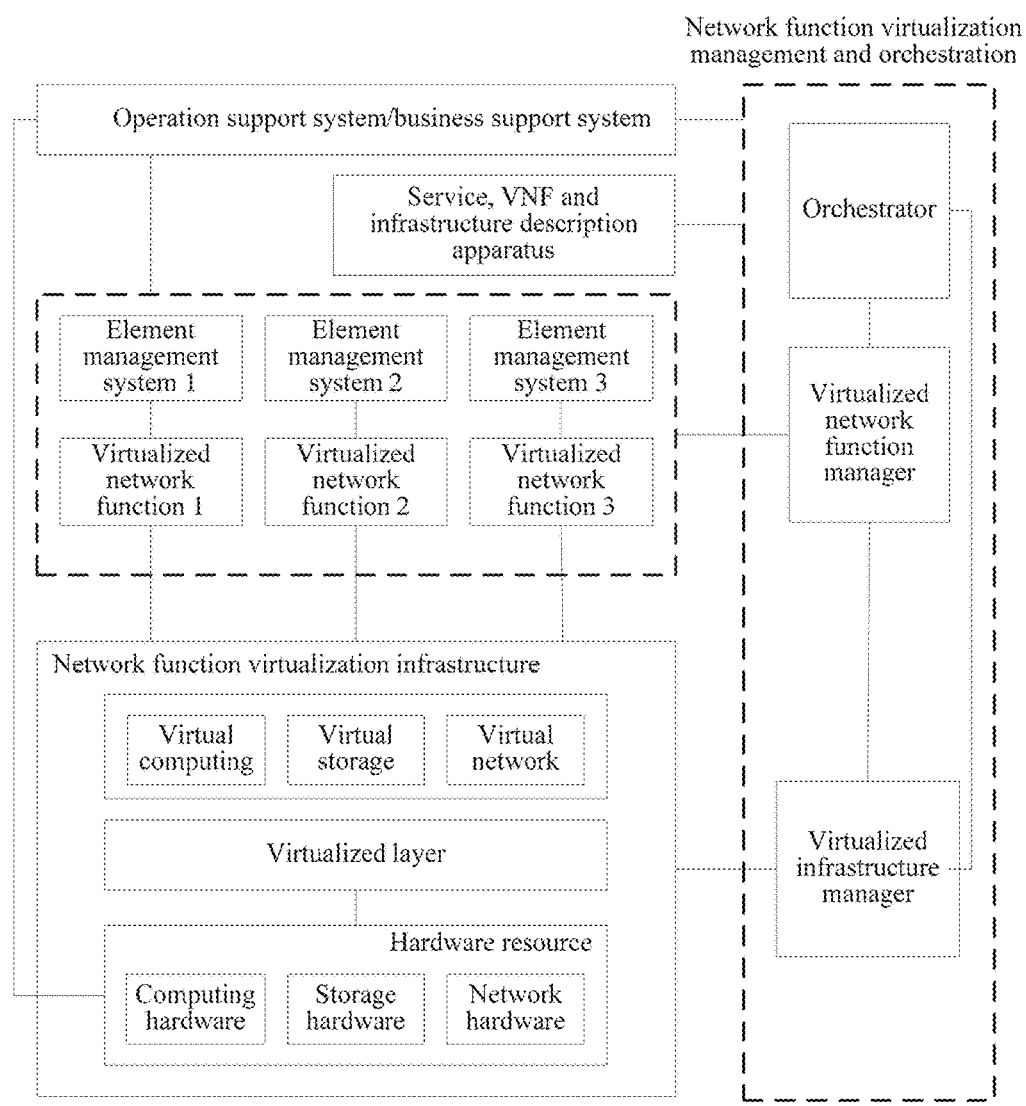
FIG. 2 is an architectural diagram of an NFV system.

As shown in FIG. 4, a fault publish node (hypervisor) publishes, to the NFV fault management apparatus 1000, fault information having a grouping identifier of the fault publish node of a group 3, a node identifier of the fault publish node of ID6, a fault type of B1, fault content of C2, and a fault occurrence time of a time 6; a fault publish node of a hardware resource publishes, to the NFV fault management apparatus 1000, fault information having a grouping identifier of the fault publish node of a group 2, a node identifier of the fault publish node of ID2, a fault type of B1, fault content of B2, and a fault occurrence time of a time 7, where as shown in FIG. 2, the hardware resource in the NFVI includes: computing hardware, storage hardware, and network hardware; a fault publish node: for example, a virtual machine (VM) publishes, to the NFV fault management apparatus 1000, fault information having a grouping identifier of the fault publish node of a group 1, a node identifier of the fault publish node of ID3, a fault type of A1, fault content of A2, and a fault occurrence time of a time 8.

It should be noted that even though each node may make a request to the NFV fault management apparatus to subscribe to and publish a fault message, and each node may also receive fault information notified by the NFV fault management apparatus, not each node needs to have the three functions: subscribing to, publishing, and receiving a notification, for example, a bottom-level storage node of NFV needs only a publishing function; for example, because an OSS node does not need to publish fault information of the OSS node to another node, the OSS node does not need a fault information publishing function.

The matching unit 13 is configured to perform matching between the fault information to which a subscription is requested and the fault publish message, and generate a fault notification message.

The NFV fault management apparatus 1000 receives fault subscription messages of one or more subscription nodes, also receives fault publish messages published by one or more fault publish nodes, where parameters included in a fault message to which a subscription is requested and the fault publish message are consistent, and generates the fault notification message by performing matching between the parameters of the fault subscription message and the fault publish message, where the fault notification message includes: a node identifier of a subscription node, a grouping identifier of the fault publish node, a node identifier of the fault publish node, a fault type, and/or fault content, and/or a fault priority, and may further include a time for receiving the fault publish message and a time for notifying the fault information.

As shown in FIG. 4, the fault publish message includes the fault information to which a subscription is requested and that has the fault type of B1 and the fault content of C2, the fault type of B1 and the fault content of B2, and the fault type of A1 and the fault content of A2.

The notification unit 14 is configured to notify the fault notification message to a corresponding subscription node associated with the node identifier of the at least one subscription node.

After performing matching between the parameters of the fault information to which a subscription is requested and the fault publish message, the matching unit 13 obtains one or more fault notification messages, and the notification unit 14 separately notifies the one or more fault notification messages to a corresponding subscription node.

As shown in FIG. 4, the notification unit 14 separately notifies the fault information having the fault type of A1 and the fault content of A2 to the subscription nodes VIM and NFVO, notifies the fault information having the fault type of B1 and the fault content of B2 to the subscription node VNF, and separately notifies the fault information having the fault type of B1 and the fault content of C2 to the subscription nodes VNFM and NFVO.

As shown in FIG. 4, the fault publish message further includes a fault priority, for example, the fault information that is published by the fault publish node VNFM and that has the fault type of B1 and the fault content of C2 has a fault priority of 3, the fault information that is published by the fault publish node of the hardware resource and that has the fault type of B1 and the fault content of B2 has a fault priority of 2, and the fault information that is published by the fault publish node: virtual machine (VM) and that has the fault type of A1 and the fault content of A2 has a fault priority of 1; herein, it is considered by default that a descending order of the priorities is 1, 2, and 3.

The notification unit 14 may successively notify the subscription nodes in the descending order of the fault priorities according to the fault priorities of the fault publish messages. As shown in FIG. 4, first, a fault notification message having a fault priority of 1, a fault type of A1, and fault content of A2 is notified to the subscription nodes VIM and NFVO; then, a fault notification message having a fault priority of 2, a fault type of B1, and fault content of B2 is notified to the subscription node VNF, and meanwhile, a fault notification message having a fault priority of 2, a fault type of B1, and fault content of C2 is notified to the subscription node VNFM; finally, a fault notification message having a fault priority of 3, a fault type of B1, and fault content of C2 is notified to the subscription node NFVO. Generally, a fault of a node at a lower level is more important and emergent, and has a higher requirement on delay performance.

If two or more subscription nodes request to subscribe to fault information having a same fault type and same fault content, the notification unit 14 may further notify both fault notification messages having a same fault type and same fault content to the two or more subscription nodes.

After receiving the fault notification messages, the subscription nodes start a fault processing mechanism.

It can be seen that, according to an NFV fault management apparatus provided in this embodiment of the present invention, the NFV fault management apparatus disposed in an NFV system centrally receives a fault subscription message and a fault publish message of any node in the NFV system, performs matching between parameters of the received fault subscription message and fault publish message, and notifies a fault notification message to a corresponding node, which can implement real-time and quick location and notification of node fault information.

Figure 5:
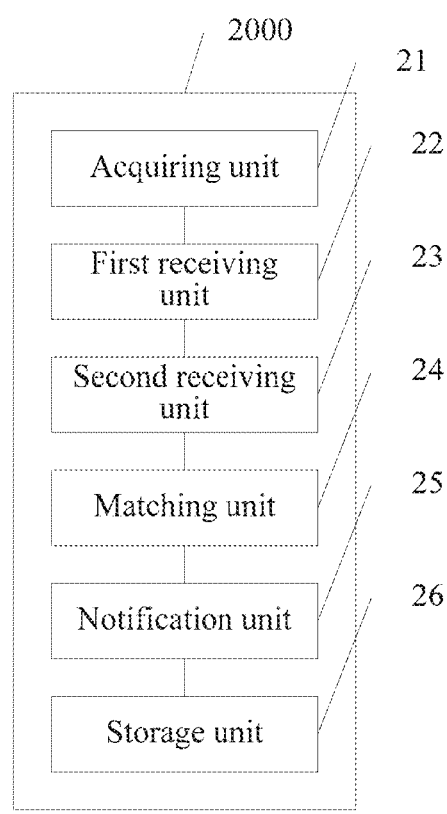
FIG. 5 is a schematic structural diagram of another NFV fault management apparatus according to an embodiment of the present invention.

Refer to FIG. 5, which is a schematic structural diagram of another NFV fault management apparatus according to an embodiment of the present invention. The apparatus 2000 includes: an acquiring unit 21, a first receiving unit 22, a second receiving unit 23, a matching unit 24, and a notification unit 25, and a storage unit 26.

The acquiring unit 21 is configured to acquire a correspondence between an identifier of at least one virtualized network function VNF node and an identifier of at least one network function virtualization infrastructure NFVI node from a network function virtualization orchestrator NFVO.

A VNF node in an existing NFV system does not know a resource configuration situation of NFVI that corresponds to the VNF node. Therefore, the NFV fault management apparatus needs to store VNF information and NFVI resource configuration information that corresponds to the VNF information, that is, the correspondence between the identifier of the VNF node and the identifier of the NFVI node.

The acquiring unit 21 may acquire the correspondence between the identifier of the VNF node and the identifier of the NFVI node in six manners:

Manner 1: After instantiating a VNF, and updating a VNF catalog, an NFV service catalog, and a VNF instance by an NFVO, the NFVO sends a correspondence between a VNF node identifier and an NFVI resource configuration to the NFV fault management apparatus. The NFV fault management apparatus stores the correspondence between the VNF node identifier and the NFVI resource configuration, and the correspondence is used by the NFV fault management apparatus to perform processing of matching between fault messages.

Manner 2: In a case in which load of a VNF increases or load of a VNF gradually decreases, to ensure that resources are effectively used, the NFV system may start a VNF scaling process, to increase or decrease resources used by the VNF. After a VNF instance scaling down/VNF instance scaling up process is completed, after the NFVO updates a VNF catalog, an NFV service catalog, and a VNF instance, the NFVO sends a correspondence between a VNF node identifier and an NFVI resource configuration to the NFV fault management apparatus. The NFV fault management apparatus stores the correspondence between the VNF node identifier and the NFVI resource configuration, and the correspondence is used by the NFV fault management apparatus to perform processing of matching between fault messages.

Manner 3: After a fault subscription message of NFV is received, the NFV fault management apparatus may request a correspondence between a VNF node identifier and an NFVI resource configuration from an NFVO.

Manner 4: After a fault subscription message of NFV is received, the NFV fault management apparatus may request a correspondence between a VNF node identifier and an NFVI resource configuration from a VNF instance database and/or an NFVI resource configuration database.

Manner 5: A VNF may acquire information about a corresponding VM, and in a fault subscription message of NFV, the VNF sends a correspondence between the VNF and the VM to the NFV fault management apparatus. After the fault subscription message of the VNF is received, the NFV fault management apparatus may request a correspondence between the VM and an NFVI resource configuration from a VIM or a Hypervisor. The NFV fault management apparatus stores a correspondence between a VNF node identifier and the VM, the correspondence between the VM and the NFVI resource configuration, and a correspondence between the VNF node identifier and the NFVI resource configuration with reference to the foregoing information, and the correspondences are used by the NFV fault management apparatus to perform processing of matching between fault messages.

Manner 6: After a fault subscription message of NFV is received, the NFV fault management apparatus may request a correspondence between a VNF and a VM from a VNFM, and request a correspondence between the VM and an NFVI resource configuration from the VIM or a Hypervisor. The NFV fault management apparatus stores a correspondence between a VNF node identifier and the VM, the correspondence between the VM and the NFVI resource configuration, and a correspondence between the VNF node identifier and the NFVI resource configuration with reference to the foregoing information, and the correspondences are used by the NFV fault management apparatus to perform processing of matching between fault messages.

The first receiving unit 22 is configured to receive a fault subscription message, which is sent by at least one subscription node in the NFV system, for requesting to subscribe to fault information of the at least one NFVI fault publish node.

A function of the first receiving unit 22 is the same as that of the first receiving unit 11 in the foregoing embodiment, and a difference is that in this embodiment, any subscription node in the NFV system requests to subscribe to fault information of each node in the NFVI, that is, the NFV fault management apparatus 2000 in this embodiment manages a fault of each node in the NFVI. The apparatus 2000 collects a fault message published by each fault publish node in the NFVI, and provides a subscription and notification function of the fault message of each fault publish node in the NFVI for an upper-level subscription node of the NFVI. The apparatus 2000 may be independently deployed, or may be deployed in the NFVI, or may be in a VIM, which is not limited in this embodiment of the present invention. In addition, the apparatus 2000 may also independently serve a VNF. The apparatus 2000 is created while the VNF is created. If the VNF fails, the apparatus 2000 corresponding to the VNF fails simultaneously.

The second receiving unit 23 is configured to receive a fault publish message sent by the at least one NFVI fault publish node.

A function of the second receiving unit 23 is the same as that of the second receiving unit 12 in the foregoing embodiment, and a difference is that in this embodiment, the second receiving unit 23 receives a fault publish message sent by each fault publish node in the NFVI.

The matching unit 24 is configured to: after a fault subscription message of the at least one VNF subscription node and the fault publish message of the at least one NFVI fault publish node are received, perform matching between fault information to which a subscription is requested by the at least one VNF subscription node and the fault publish message of the at least one NFVI fault publish node according to the correspondence, and generate the fault notification message.

A function of the matching unit 24 is the same as that of the matching unit 13 in the foregoing embodiment, and a difference is that different from that other upper-level management nodes such as a VNFM, an OSS/BSS, and a VIM already know a relationship between these upper-level management nodes and other nodes managed by these upper-level management nodes, in this embodiment, a VNF subscription node subscribes to the fault message of the fault publish node in the NFVI, and after the fault message published by each fault publish node in the NFVI is received, needs to learn, according to a correspondence, which is acquired by the acquiring unit 21, between the identifier of the VNF subscription node and the identifier of the NFVI fault publish node, that fault information published by the NFVI fault publish node should correspond to an identifier of which VNF subscription node.

In another implementation manner, the matching unit 24 may also be configured to: after a fault subscription message of the at least one VNF subscription node and a fault publish message of at least one hardware resource node or virtualization management program (hypervisor) or virtual machine in the NFVI are received, perform matching between the fault information to which a subscription is requested by the at least one VNF subscription node and the fault publish message of the at least one hardware resource node or virtualization management program or virtual machine according to the correspondence, and generate the fault notification message, where the apparatus is located in any virtual resource node in the NFVI, and the virtual resource node includes the virtual machine (VM) and/or the virtualization management program.

Specifically, in the NFVI, the virtual resource node includes the virtual machine and/or the virtualization management program, where the virtual machine includes a virtual computing node, a virtual storage node, and a virtual network node, and the hardware resource node includes a computing hardware node, a storage hardware node, and a network hardware node. The NFV fault management apparatus is disposed in any one or each virtual resource node in the NFVI, so that the NFV fault management apparatus is configured to receive the fault subscription message of the VNF subscription node, and receive fault publish messages of the one or more hardware resource nodes or virtual machines or virtualization management programs in the NFVI, perform matching between the fault information to which a subscription is requested by the VNF subscription node and the fault publish message of the hardware resource node or virtual machine or virtualization management program according to the correspondence between the identifier of the VNF node and an identifier of the hardware resource node or virtual machine or virtualization management program, and generate the fault notification message.

The notification unit 25 is configured to notify the fault notification message to a corresponding subscription node associated with the node identifier of the at least one subscription node.

A function of the notification unit 25 is the same as that of the notification unit 14 in the foregoing embodiment, and is not described herein again.

If the NFV fault management apparatus is located in the virtual resource node, because SWA5(vn-nF) is an interface between the VNF and the NFVI, in this implementation manner, the SWA5(vn-nF) interface needs to support a function that a VNF fault subscription node subscribes to fault information from the NFV fault management apparatus and a function that the NFV fault management apparatus notifies the fault information to the VNF fault subscription node.

Figure 6:
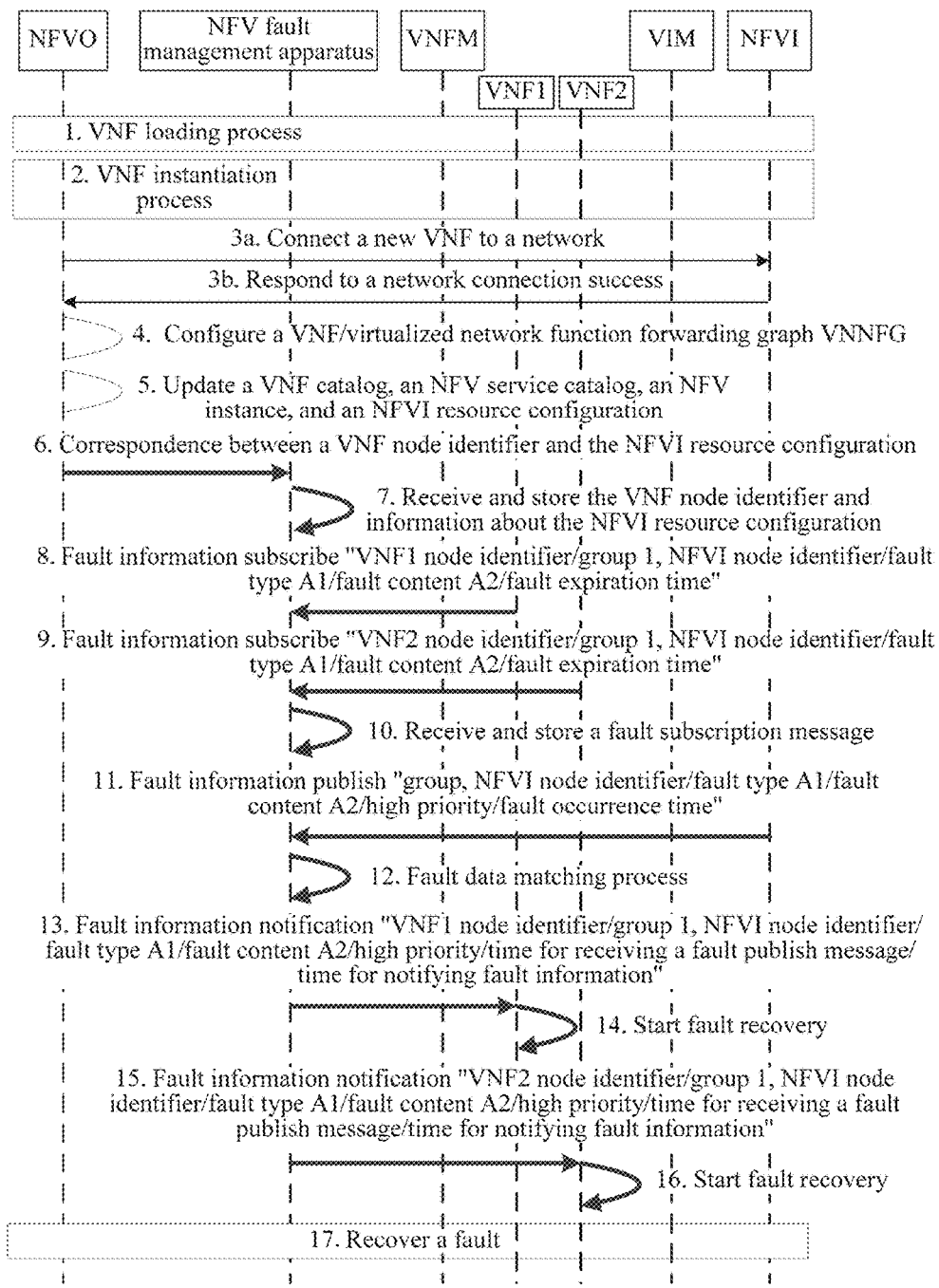
FIG. 6 is another exemplary schematic flowchart of subscribing to, publishing, and notifying fault information.

FIG. 6 is another exemplary schematic flowchart of subscribing to, publishing, and notifying fault information. This process includes the following steps:

1. VNF loading process, where in this process, an NSD and a VNFD of a VNF are loaded into a VNF catalog;

2. VNF1 instantiation process;

3. an NFVO requests a VIM to connect the VNF to a network;

4. the NFVO configures a VNFFG, and the NFVO or an EMS or a VNFM configures a VNF instance;

5. the NFVO updates the VNF catalog, an NFV Service Catalog, and VNF Instances (adds a new VNF instance entry and the like);

6. the NFVO sends a correspondence between a VNF ID and an NFVI resource configuration to an NFV fault management apparatus;

7. the NFV fault management apparatus receives and stores information about the correspondence between the VNF ID and the NFVI resource configuration;

8. VNF1 sends a fault subscription message "VNF1 node identifier/group 1, NFVI node identifier/fault type A1/fault content A2/fault expiration time" to the NFV fault management apparatus, where the message carries information needing to be subscribed to, such as a node identifier of a subscription node, a group in which a fault publish node is located, a node identifier of the fault publish node, a fault type, fault content, and a fault expiration time;

9. VNF2 sends a fault subscription message "VNF2 node identifier/group 1, NFVI node identifier/fault type A1/fault content A2/fault expiration time" to the NFV fault management apparatus, where the message carries information needing to be subscribed to, such as a node identifier of a subscription node, a group in which a fault publish node is located, a node identifier of the fault publish node, a fault type, fault content, and a fault expiration time; in this instance, the VNF2 and the VNF1 subscribe to fault publish messages having the same fault type and fault content;

10. the NFV fault management apparatus receives and stores the fault subscription message of the VNF node;

11. if the NFVI node is faulty, the NFVI node sends a fault publish message "NFVI node identifier/fault type A1/fault content A2/high priority/fault occurrence time" to the NFV fault management apparatus, where the message carries information, such as an identifier of a fault publish node, a fault type, fault content, a fault priority, and a fault occurrence time;

12. the NFV fault management apparatus performs matching between the received fault publish message and fault subscription message, performs filtering and deduplication, and prepares to notify a fault according to information, such as a fault priority and a subscription node identifier;

13. the NFV fault management apparatus sends a fault notification to the NFV fault message subscription node VNF1 by using a fault notification message "VNF1 node identifier/group 1, NFVI node identifier/fault type A1/fault content A2/high priority/time for receiving a fault publish message/time for notifying fault information" according to information, such as a fault priority and a node identifier of a subscription node; if there are multiple NFV nodes, for example, the VNF1 and the VNF2 subscribe to a fault having a same type and same content, the NFV fault management apparatus may notify same fault information to both the VNF1 and the VNF2, that is, both steps 13 and 15 may occur;

14. the VNF1 starts a fault recovery mechanism;

15. the NFV fault management apparatus sends a fault notification to the NFV fault message subscription node VNF2 by using a fault notification message "VNF2 node identifier/group 1, NFVI node identifier/fault type A1/fault content A2/high priority/time for receiving a fault publish message/time for notifying fault information" according to information, such as a fault priority and a node identifier of a subscription node;

16. the VNF1 starts a fault recovery mechanism; and 17. a fault recovery process.

The storage unit 26 is configured to associatively store the fault subscription message, the fault publish message, and/or the fault notification message.

For each fault subscription message and fault publish message, if the matching unit 24 successfully performs matching, the storage unit 26 associatively stores the fault subscription message, the fault publish message, and the fault notification message; if the matching unit 24 does not successfully perform matching, the storage unit 26 still associatively stores the fault subscription message and the fault publish message, so as to facilitate subsequent querying, invoking and the like by the NFV system.

It can be seen that, according to an NFV fault management apparatus provided in this embodiment of the present invention, the NFV fault management apparatus disposed in an NFV system centrally receives a fault subscription message and a fault publish message of any node in the NFV system, performs matching between parameters of the received fault subscription message and fault publish message, and notifies a fault notification message to a corresponding node, which can implement real-time and quick location and notification of node fault information.

The VNF loading process refers to that a VNF package is submitted to the NFVO, so that the VNF package is included in a VNFD catalog.

The VNF package: a file of the VNF, includes a VNFD of the VNF, a software image, and some other components, for example, a component configured to check integrity of the file and prove validity of the file.

VNFD: is a configuration template that describes NFV deployment and operation behaviors, and is used in the VNF loading process and the VNF instantiation process. The deployment behavior includes, but is not limited to, deployment environments required by the VNF, such as a quantity of VMs, a quantity of VM images, and required computing and storage resources; the operation behavior includes, but is not limited to, a VNF topology, starting and closing, a functional script that matches a life cycle event of the VNF and the like.

VNF loading process:

1) a sender submits the VNF Package to the NFVO, so as to load the VNFD;

2) the NFVO processes the VNFD, which includes, but is not limited to:
   a. checking existence of a managed element; and
   b. verifying authenticity and reliability of the VNFD by using a manifest (manifest) and a certificate in the VNFD;

3) the NFVO notifies a Catalog; and 4) the NFVO confirms loading of the VNF.

Note: the adding the VNFD to the Catalog may be performed by the NFVO or another entity determined/authorized by the NFVO.

Figure 7:
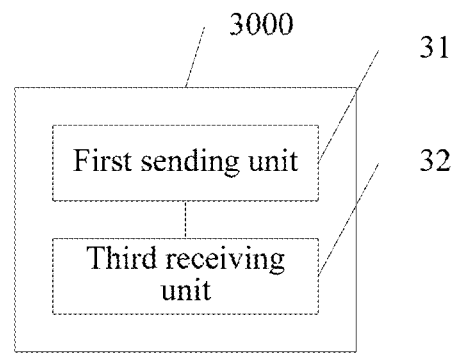
FIG. 7 is a schematic structural diagram of an NFV node according to an embodiment of the present invention.

Refer to FIG. 7, which is a schematic structural diagram of an NFV node according to an embodiment of the present invention. The NFV node 3000 includes: a first sending unit 31 and a third receiving unit 32.

The first sending unit 31 is configured to send, to an NFV fault management apparatus, a fault subscription message that carries a node identifier and fault information to which a subscription is requested, so that the NFV fault management apparatus performs matching between the fault information to which a subscription is requested and a fault publish message that is sent by a fault publish node and that corresponds to the fault subscription message, and generates a fault notification message.

The NFV node 3000 is the subscription node in the foregoing embodiment, and the subscription node may be any node in an NFV system. The fault information to which a subscription is requested by the first sending unit 31 and the fault publish message may include: a grouping identifier of the fault publish node, a node identifier of the fault publish node, a fault type, and/or fault content, and/or a fault priority. For a specific format for sending a fault subscription message by the first sending unit 31, reference may be made to the foregoing embodiment, and details are not described herein again.

The third receiving unit 32 is configured to receive the fault notification message that is sent by the NFV fault management apparatus according to the node identifier.

The third receiving unit 32 receives the fault notification message sent by the NFV fault management apparatus, where the fault notification message includes: a node identifier of a subscription node, a grouping identifier of the fault publish node, a node identifier of the fault publish node, a fault type, and/or fault content, and/or a fault priority, and may further include a time for receiving the fault publish message and a time for notifying the fault information. The NFV fault management apparatus sends, according to the node identifier, the fault notification message to an NFV subscription node that corresponds to the node identifier.

In a feasible implementation manner, the NFV node in this embodiment is a virtualized network function VNF node, and the first sending unit 31 is specifically configured to send, to the NFV fault management apparatus, a fault subscription message, which carries the node identifier of the VNF node, for requesting to subscribe to fault information of at least one network function virtualization infrastructure NFVI fault publish node, so that the NFV fault management apparatus performs, according to a correspondence between the node identifier of the VNF node and a node identifier of the at least one NFVI node, matching between the fault information, to which a subscription is requested, of the at least one NFVI node and a fault publish message sent by the at least one NFVI node, and generates the fault notification message.

The implementation manner is that the VNF subscription node subscribes to the fault publish message of the NFVI node. A VNF node in an existing NFV system does not know a resource configuration situation of NFVI that corresponds to the VNF node. Therefore, the NFV fault management apparatus needs to store VNF information and NFVI resource configuration information that corresponds to the VNF information, that is, a correspondence between the identifier of the VNF node and the identifier of the NFVI node. Then, that the VNF node sends the fault subscription message and receives the fault notification message sent by the NFV fault management apparatus is the same as that in the foregoing embodiment, and is not described herein again.

The NFV fault management apparatus collects a fault message published by each fault publish node in the NFVI, and provides a subscription and notification function of the fault message of each fault publish node in the NFVI for an upper-level subscription node of the NFVI. The NFV fault management apparatus may be independently deployed, or may be deployed in the NFVI, or may be in a VIM, which is not limited in this embodiment of the present invention. In addition, the NFV fault management apparatus may also independently serve a VNF, and the NFV fault management apparatus is created while the VNF is created. If the VNF fails, the NFV fault management apparatus corresponding to the VNF fails simultaneously.

In another feasible implementation manner, the first sending unit 31 is specifically configured to send, to the NFV fault management apparatus, a fault subscription message, which carries the node identifier of the VNF node, for requesting to subscribe to fault information of at least one hardware resource node or virtualization management program hypervisor or virtual machine Virtual Machine in the NFVI, so that the NFV fault management apparatus performs, according to a correspondence between the node identifier of the VNF node and a node identifier of the at least one hardware resource node or virtualization management program or virtual machine, matching between the fault information, to which a subscription is requested, of the at least one hardware resource node or virtualization management program or virtual machine and a fault publish message sent by the at least one hardware resource node or virtualization management program or virtual machine, and generates the fault notification message, where the NFV fault management apparatus is located in any virtual resource node in the NFVI, and the virtual resource node includes the virtualization management program and/or the virtual machine.

Specifically, in the NFVI, the virtual resource node includes the virtual machine and/or the virtualization management program, where the virtual machine includes a virtual computing node, a virtual storage node, and a virtual network node, and the hardware resource node includes a computing hardware node, a storage hardware node, and a network hardware node. The NFV fault management apparatus is disposed in any one or each virtual resource node in the NFVI, so that the NFV fault management apparatus is configured to receive the fault subscription message of the VNF subscription node, and receive the fault publish messages of the one or more hardware resource nodes or virtual machines or virtualization management programs in the NFVI, perform matching between the fault information to which a subscription is requested by the VNF subscription node and the fault publish message of the hardware resource node or virtual machine or virtualization management program according to the correspondence between the identifier of the VNF node and an identifier of the hardware resource node or virtual machine or virtualization management program, and generate the fault notification message.

Specifically, SWA5(vn-nF) is an interface between the VNF and the NFVI, and a VNF subscription node sends the fault subscription message to the NFV fault management apparatus by using the interface, and receives, by using the interface, the fault notification message sent by the NFV fault management apparatus.

It can be seen that, according to an NFV node provided in this embodiment of the present invention, an NFV fault management apparatus disposed in an NFV system centrally receives a fault subscription message and a fault publish message of any node in the NFV system, performs matching between parameters of the received fault subscription message and fault publish message, and notifies a fault notification message to a corresponding node, which can implement real-time and quick location and notification of node fault information.

Figure 8:
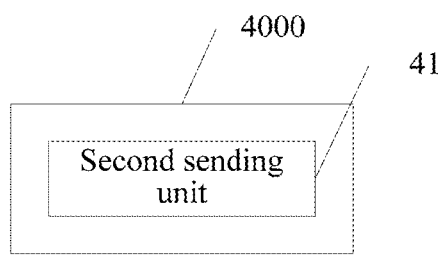
FIG. 8 is a schematic structural diagram of another NFV node according to an embodiment of the present invention.

Refer to FIG. 8, which is a schematic structural diagram of another NFV node according to an embodiment of the present invention. The NFV node 4000 includes:

a second sending unit 41, configured to send a fault publish message to an NFV fault management apparatus, so that the NFV fault management apparatus performs matching between fault information to which a subscription is requested and that is received from a subscription node and the fault publish message, generates a fault notification message, and notifies the fault notification message to the subscription node.

The NFV node 4000 is the fault publish node in the foregoing embodiment, and the NFV node 4000 may be any node in an NFV system. The fault publish message sent by the second sending unit 41 includes: a grouping identifier of a fault publish node, a node identifier of the fault publish node, a fault type, and/or fault content, and/or a fault priority, and a parameter included in the fault information to which a subscription is requested is consistent with that included in the fault publish message. For a format for sending the fault publish message by the second sending unit 41 to the NFV fault management apparatus, reference may be made to the foregoing embodiment, and details are not described herein again.

It can be seen that, according to an NFV node provided in this embodiment of the present invention, an NFV fault management apparatus disposed in an NFV system centrally receives a fault subscription message and a fault publish message of any node in the NFV system, performs matching between parameters of the received fault subscription message and fault publish message, and notifies a fault notification message to a corresponding node, which can implement real-time and quick location and notification of node fault information.

Figure 9:
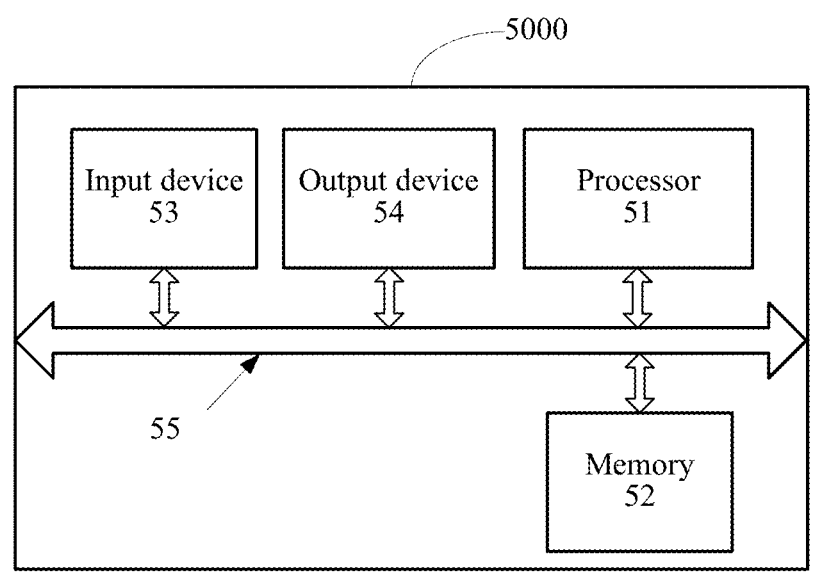
FIG. 9 is a schematic structural diagram of an NFV fault management device according to an embodiment of the present invention.

Refer to FIG. 9, which is a schematic structural diagram of an NFV fault management device according to an embodiment of the present invention. The NFV fault management device 5000 in this embodiment includes a processor 51, a memory 52, an input apparatus 53, an output apparatus 54, and a bus system 55.

The processor 51 controls an operation of the NFV fault management device 5000, and the processor 51 may be further referred to as a central processing unit (CPU). The processor 51 may be an integrated circuit chip and has a signal processing capability. The processor 51 may also be a general purpose processor, a digital signal processor (DSP), an application-specific integrated circuit (ASIC), a field-programmable gate array (FPGA), or another programmable logical device, discrete gate or transistor logical device, or discrete hardware component. The general purpose processor may be a microprocessor or the processor may be any conventional processor or the like.

The memory 52 may include a read-only memory and a random access memory, and provides an instruction and data to the processor 51. A part of the memory 52 may further include a non-volatile random access memory (NVRAM).

Components of the NFV fault management device 5000 are coupled together by using the bus system 55. The bus system may be an industry standard architecture (ISA) bus, a peripheral component interconnect (PCI) bus, an extended industry standard architecture (EISA) bus, or the like. The bus may be one or more physical lines. When the bus is multiple physical lines, the bus may be classified into an address bus, a data bus, a control bus, and the like. In some other embodiments of the present invention, the processor 51, the memory 52, the input apparatus 53, and the output apparatus 54 may also be directly connected by using a communications line.

The input apparatus 53 may be specifically implemented as a mouse, a keyboard, a microphone, or the like, and the output apparatus 54 may be specifically implemented as a display, an audio device, or a video device. Certainly, functions of the input apparatus 53 and the output apparatus 54 may also be implemented by using one input/output device, for example, the input apparatus 53 and the output apparatus 54 are implemented as a touchscreen.

The processor 51 reads a computer program in the memory 52, so as to perform the following steps:

receiving a fault subscription message sent by at least one subscription node in an NFV system, where the fault subscription message includes: a node identifier of the at least one subscription node and fault information to which a subscription is requested;

receiving a fault publish message sent by at least one fault publish node in the NFV system;

performing matching between the fault information to which a subscription is requested and the fault publish message, and generating a fault notification message; and notifying the fault notification message to a corresponding subscription node associated with the node identifier of the at least one subscription node.

In an implementation manner, the fault information to which a subscription is requested and the fault publish message include: a grouping identifier of the fault publish node, a node identifier of the fault publish node, a fault type, and/or fault content, and/or a fault priority.

In another implementation manner, that the processor 51 performs the step of notifying the fault notification message to a corresponding subscription node associated with the node identifier of the at least one subscription node is specifically:

successively notifying, according to the fault priority, the fault notification message to the subscription node associated with the node identifier of the at least one subscription node.

In still another implementation manner, that the processor 51 performs the step of notifying the fault notification message to a corresponding subscription node associated with the node identifier of the at least one subscription node is specifically:

when fault types and/or fault content to which a subscription is requested by at least two subscription nodes are/is the same, simultaneously notifying the fault notification message to corresponding subscription nodes associated with node identifiers of the at least two subscription nodes.

In still another implementation manner, the processor 51 is further configured to perform the following step:

associatively storing the fault subscription message, the fault publish message, and/or the fault notification message.

In still another implementation manner, the processor 51 is further configured to perform the following step:

acquiring a correspondence between an identifier of at least one virtualized network function VNF node and an identifier of at least one network function virtualization infrastructure NFVI node from a network function virtualization orchestrator NFVO.

In still another implementation manner, that the processor 51 performs the step of receiving a fault subscription message sent by at least one subscription node in an NFV system is specifically:

receiving a fault subscription message, which is sent by the at least one subscription node in the NFV system, for requesting to subscribe to fault information of the at least one NFVI fault publish node.

In still another implementation manner, that the processor 51 performs the step of notifying the fault notification message to a corresponding subscription node associated with the node identifier of the at least one subscription node is specifically:

after a fault subscription message of the at least one VNF subscription node and a fault publish message of the at least one NFVI fault publish node are received, performing matching between fault information to which a subscription is requested by the at least one VNF subscription node and the fault publish message of the at least one NFVI fault publish node according to the correspondence, and generating the fault notification message.

In still another implementation manner, that the processor 51 performs the step of performing matching between the fault information to which a subscription is requested and the fault publish message, and generating a fault notification message is specifically:

after a fault subscription message of the at least one VNF subscription node and a fault publish message of at least one hardware resource node or virtualization management program hypervisor or virtual machine Virtual Machine in the NFVI are received, performing matching between fault information to which a subscription is requested by the at least one VNF subscription node and the fault publish message of the at least one hardware resource node or virtualization management program or virtual machine according to the correspondence, and generating the fault notification message, where the device is located in any virtual resource node in the NFVI, and the virtual resource node includes the virtualization management program and/or the virtual machine.

The computer program included in the processor 51 provided in this embodiment of the present invention may further be implemented as a first receiving unit, a second receiving unit, a matching unit, and a notification unit. For functions implemented by the four units, reference may be made to the descriptions in the foregoing embodiments, and details are not described herein again.

It can be seen that, according to an NFV fault management device provided in this embodiment of the present invention, an NFV fault management apparatus disposed in an NFV system centrally receives a fault subscription message and a fault publish message of any node in the NFV system, performs matching between parameters of the received fault subscription message and fault publish message, and notifies a fault notification message to a corresponding node, which can implement real-time and quick location and notification of node fault information.

Figure 10:
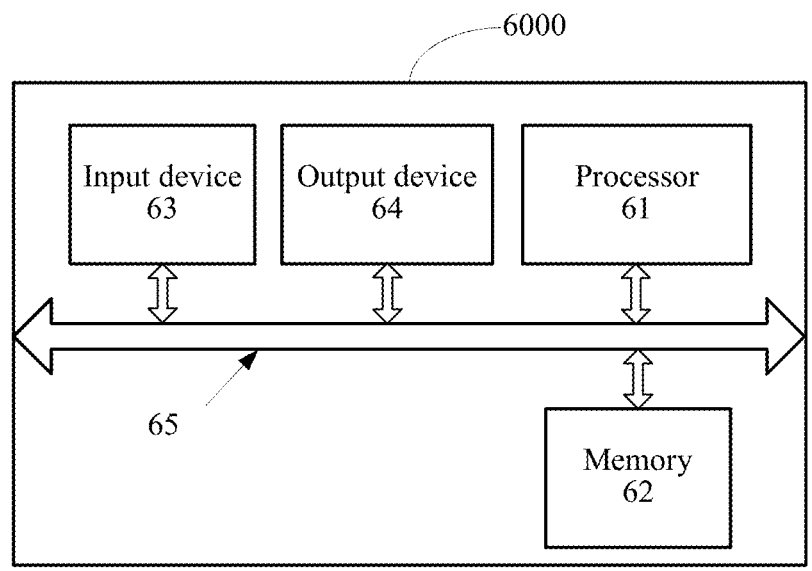
FIG. 10 is a schematic structural diagram of an NFV node device according to an embodiment of the present invention.

Refer to FIG. 10, which is a schematic structural diagram of an NFV node device according to an embodiment of the present invention. The NFV node device 6000 in this embodiment includes a processor 61, a memory 62, an input apparatus 63, an output apparatus 64, and a bus system 65.

The processor 61 controls an operation of the NFV node device 6000, and the processor 61 may be further referred to as a central processing unit (CPU). The processor 61 may be an integrated circuit chip and has a signal processing capability. The processor 61 may also be a general purpose processor, a digital signal processor (DSP), an application-specific integrated circuit (ASIC), a field-programmable gate array (FPGA), or another programmable logical device, discrete gate or transistor logical device, or discrete hardware component. The general purpose processor may be a microprocessor or the processor may be any conventional processor or the like.

The memory 62 may include a read-only memory and a random access memory, and provides an instruction and data to the processor 61. A part of the memory 62 may further include a non-volatile random access memory (NVRAM).

Components of the NFV node device 6000 are coupled together by using the bus system 65. The bus may be an industry standard architecture (ISA) bus, a peripheral component interconnect (PCI) bus, an extended industry standard architecture (EISA) bus, or the like. The bus may be one or more physical lines. When the bus is multiple physical lines, the bus may be classified into an address bus, a data bus, a control bus, and the like. In some other embodiments of the present invention, the processor 61, the memory 62, the input apparatus 63, and the output apparatus 64 may also be directly connected by using a communications line.

The input apparatus 63 may be specifically implemented as a mouse, a keyboard, a microphone, or the like, and the output apparatus 64 may be specifically implemented as a display, an audio device, or a video device. Certainly, functions of the input apparatus 63 and the output apparatus 64 may also be implemented by using one input/output device, for example, the input apparatus 63 and the output apparatus 64 are implemented as a touchscreen.

The processor 61 reads a computer program in the memory 62, so as to perform the following steps:

sending, to an NFV fault management apparatus, a fault subscription message that carries a node identifier and fault information to which a subscription is requested, so that the NFV fault management apparatus performs matching between the fault information to which a subscription is requested and a fault publish message that is sent by a fault publish node and that corresponds to the fault subscription message, and generates a fault notification message; and receiving the fault notification message that is sent by the NFV fault management apparatus according to the node identifier.

In a feasible implementation manner, the fault information to which a subscription is requested and the fault publish message include: a grouping identifier of the fault publish node, a node identifier of the fault publish node, a fault type, and/or fault content, and/or a fault priority.

In a feasible implementation manner, the NFV node device is a virtualized network function VNF node; and that the processor 61 performs the step of sending, to an NFV fault management apparatus, a fault subscription message that carries a node identifier and fault information to which a subscription is requested, so that the NFV fault management apparatus performs matching between the fault information to which a subscription is requested and a fault publish message that is sent by a fault publish node and that corresponds to the fault subscription message, and generates a fault notification message is specifically:

sending, to the NFV fault management apparatus, a fault subscription message, which carries the node identifier of the VNF node, for requesting to subscribe to fault information of at least one network function virtualization infrastructure NFVI fault publish node, so that the NFV fault management apparatus performs, according to a correspondence between the node identifier of the VNF node and a node identifier of the at least one NFVI node, matching between the fault information, to which a subscription is requested, of the at least one NFVI node and a fault publish message sent by the at least one NFVI node, and generates the fault notification message.

It can be seen that, according to an NFV node device provided in this embodiment of the present invention, an NFV fault management apparatus disposed in an NFV system centrally receives a fault subscription message and a fault publish message of any node in the NFV system, performs matching between parameters of the received fault subscription message and fault publish message, and notifies a fault notification message to a corresponding node, which can implement real-time and quick location and notification of node fault information.

Figure 11:
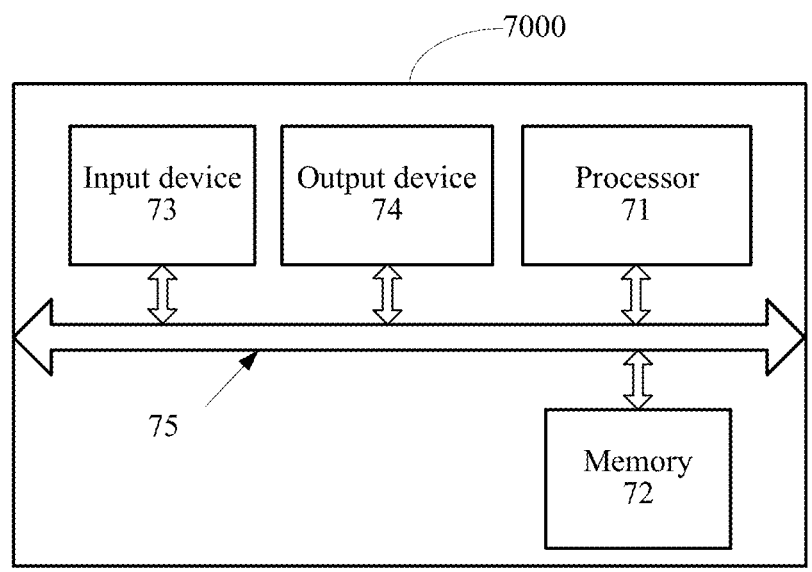
FIG. 11 is a schematic structural diagram of another NFV node device according to an embodiment of the present invention.

Refer to FIG. 11, which is a schematic structural diagram of another NFV node device according to an embodiment of the present invention. The NFV node device 7000 in this embodiment includes a processor 71, a memory 72, an input apparatus 73, an output apparatus 74, and a bus system 75.

The processor 71 controls an operation of the NFV node device 7000, and the processor 71 may be further referred to as a central processing unit (CPU). The processor 71 may be an integrated circuit chip and has a signal processing capability. The processor 71 may also be a general purpose processor, a digital signal processor (DSP), an application-specific integrated circuit (ASIC), a field-programmable gate array (FPGA), or another programmable logical device, discrete gate or transistor logical device, or discrete hardware component. The general purpose processor may be a microprocessor or the processor may be any conventional processor or the like.

The memory 72 may include a read-only memory and a random access memory, and provides an instruction and data to the processor 71. A part of the memory 72 may further include a non-volatile random access memory (NVRAM).

Components of the NFV node device 7000 are coupled together by using the bus system 75. The bus may be an industry standard architecture (ISA) bus, a peripheral component interconnect (PCI) bus, an extended industry standard architecture (EISA) bus, or the like. The bus may be one or more physical lines. When the bus is multiple physical lines, the bus may be classified into an address bus, a data bus, a control bus, and the like. In some other embodiments of the present invention, the processor 71, the memory 72, the input apparatus 73, and the output apparatus 74 may also be directly connected by using a communications line.

The input apparatus 73 may be specifically implemented as a mouse, a keyboard, a microphone, or the like, and the output apparatus 74 may be specifically implemented as a display, an audio device, or a video device. Certainly, functions of the input apparatus 73 and the output apparatus 74 may also be implemented by using one input/output device, for example, the input apparatus 73 and the output apparatus 74 are implemented as a touchscreen.

The processor 71 reads a computer program in the memory 72, so as to perform the following step:

sending a fault publish message to an NFV fault management apparatus, so that the NFV fault management apparatus performs matching between fault information to which a subscription is requested and that is received from a subscription node and the fault publish message, generates a fault notification message, and notifies the fault notification message to the subscription node, where the fault information to which a subscription is requested and the fault publish message include: a grouping identifier of a fault publish node, a node identifier of the fault publish node, a fault type, and/or fault content, and/or a fault priority.

In a feasible implementation manner, that the processor 71 performs the step of sending, to an NFV fault management apparatus, a fault subscription message that carries a node identifier and fault information to which a subscription is requested, so that the NFV fault management apparatus performs matching between the fault information to which a subscription is requested and a fault publish message that is sent by a fault publish node and that corresponds to the fault subscription message, and generates a fault notification message is specifically:

sending, to the NFV fault management apparatus, a fault subscription message, which carries the node identifier of the VNF node, for requesting to subscribe to fault information of at least one hardware resource node or virtualization management program hypervisor or virtual machine Virtual Machine in the NFVI, so that the NFV fault management apparatus performs, according to a correspondence between the node identifier of the VNF node and a node identifier of the at least one hardware resource node or virtualization management program or virtual machine, matching between the fault information, to which a subscription is requested, of the at least one hardware resource node or virtualization management program or virtual machine and a fault publish message sent by the at least one hardware resource node or virtualization management program or virtual machine, and generates the fault notification message, where the NFV fault management apparatus is located in any virtual resource node in the NFVI, and the virtual resource node includes the virtualization management program and/or the virtual machine.

It can be seen that, according to an NFV node device provided in this embodiment of the present invention, an NFV fault management apparatus disposed in an NFV system centrally receives a fault subscription message and a fault publish message of any node in the NFV system, performs matching between parameters of the received fault subscription message and fault publish message, and notifies a fault notification message to a corresponding node, which can implement real-time and quick location and notification of node fault information.

Figure 12:
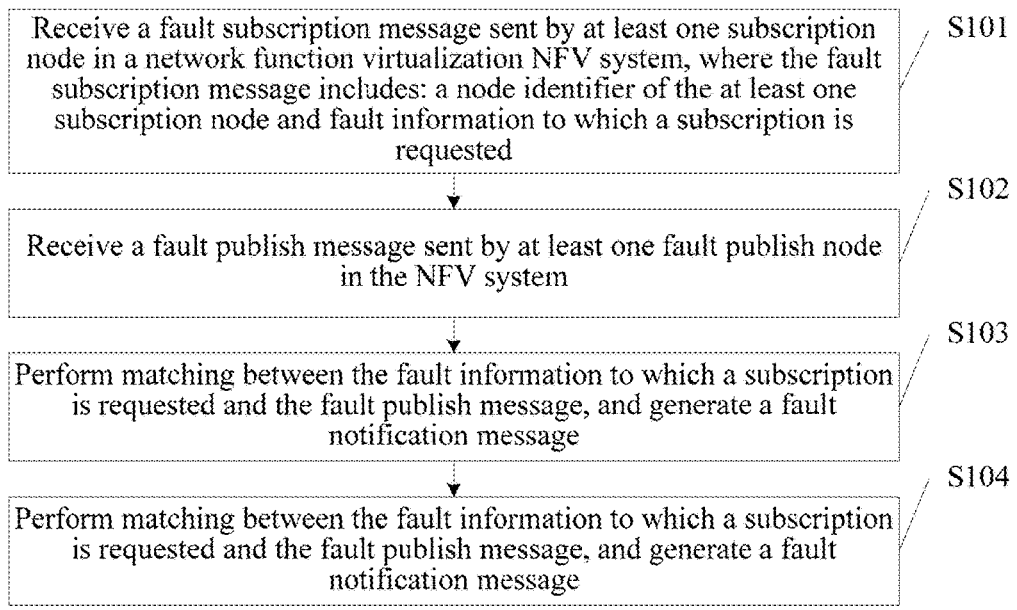
FIG. 12 is a flowchart of an NFV fault management method according to an embodiment of the present invention.

Refer to FIG. 12, which is a flowchart of an NFV fault management method according to an embodiment of the present invention. The method includes the following steps:

Step S101: Receive a fault subscription message sent by at least one subscription node in an NFV system, where the fault subscription message includes: a node identifier of the at least one subscription node and fault information to which a subscription is requested.

In the NFV system, each node may subscribe to fault information of other nodes from an NFV fault management apparatus, these subscription nodes may be a VNF, an EMS, NFVI, a VIM, an NFVO, a VNFM, an OSS/BSS, and the like, and each subscription node may subscribe to fault information of one or more fault publish nodes. A subscription node sends the fault subscription message to the NFV fault management apparatus, where the fault subscription message includes: a node identifier of the subscription node and fault information to which a subscription is requested, the node identifier of the subscription node is used to uniquely identify one subscription node, and the fault information to which a subscription is requested may include: a grouping identifier of a fault publish node, a node identifier of the fault publish node, a fault type, and/or fault content, and/or a fault priority, and may further include a fault expiration time. While subscribing to the fault message, the subscription node activates a fault message receiving function of the subscription node, so as to receive fault information notified by the NFV fault management apparatus.

If the node does not need to subscribe to some type of fault information, the node may also send fault information unsubscribe "Fault Message Unsubscribe" to the NFV fault management apparatus. In an exemplary schematic flowchart of subscribing to, publishing, and notifying fault information shown in FIG. 4, a node VIM having a subscription node identifier of ID1 sends a "Fault Message Unsubscribe" message having a grouping identifier of a fault publish node of a group 1, a node identifier of the fault publish node of ID3, a fault type of A1, and fault content of A2 to the NFV fault management apparatus, and a node NFVO having a subscription node identifier of ID4 sends a "Fault Message Unsubscribe" message having a grouping identifier of the fault publish node of a group 1, a node identifier of the fault publish node of ID3, a fault type of B1, and fault content of C2 to the NFV fault management apparatus, so as to unsubscribe to the fault message and deactivate a fault receiving function of the node.

Definitions of main parameter information carried in the fault subscription message are as follows:

Grouping identifier Group of a fault publish node: a group in which the fault publish node is located, where a specific grouping rule is not limited in this embodiment of the present invention. For example, all VNFs for one network service may be used as a group, and a subscription node generally subscribes to only fault information of a fault publish node of a group in which the subscription node is located. A definition of a network service in NFV refers to: including multiple VNFs or multiple VNFs and physical network functions (PNF), so as to provide a more complex function. For example, an evolved packet core network (EPC) including a virtual or physical MME, PGW/SGW, and home subscriber server (HSS), and virtual links between them can be referred to as a network Service.

Node identifier Node ID of a fault publish node: the node identifier of the fault publish node is generally used to identify and locate a publisher of fault information, that is, the node identifier indirectly provides fault location information. Fault type/content Fault type/Content: specific fault information includes a fault type and fault content.

Fault priority: an identifier of an emergency and importance degree of a fault.

Fault expiration time: a valid time for subscribing to fault information. This is an optional parameter whose usage is as follows: for example, 3600 s indicates that a subscription node subscribes to a fault message in 3600 s after sending the fault subscription message, and the fault subscription message is obsolete out of 3600 s; or for example, 20:00 to 22:00 indicates that the subscription node subscribes to a fault message in this period of time, and the fault subscription message is obsolete out of the period of time.

A fault subscription message sent by any subscription node in the NFV system is received.

As shown in FIG. 4, the subscription node NFVO having a node identifier of the subscription node of ID4 subscribes to, from the NFV fault management apparatus, fault information having a grouping identifier of a fault publish node of a group 1, a node identifier of the fault publish node of ID3, a fault type of A1, fault content of A2, and a fault expiration time of a time 1, and fault information having a grouping identifier of a fault publish node of a group 3, a node identifier of the fault publish node of ID6, a fault type of B1, fault content of C2, and a fault expiration time of a time 2; a subscription node VNFM having a node identifier of the subscription node of ID7 subscribes to, from the NFV fault management apparatus, fault information having a grouping identifier of a fault publish node of a group 3, a node identifier of the fault publish node of ID6, a fault type of B1, fault content of C2, and a fault expiration time of a time 3; a subscription node VNF having a node identifier of the subscription node of ID5 subscribes to, from the NFV fault management apparatus, fault information having a grouping identifier of a fault publish node of a group 2, a node identifier of the fault publish node of ID2, a fault type of B1, fault content of B2, and a fault expiration time of a time 4; a subscription node VIM having a node identifier of the subscription node of ID1 subscribes to, from the NFV fault management apparatus, fault information having a grouping identifier of a fault publish node of a group 1, a node identifier of the fault publish node of ID3, a fault type of A1, fault content of A2, and a fault expiration time of a time 5.

Step S102: Receive a fault publish message sent by at least one fault publish node in the NFV system.

In the NFV system, each node may also send the fault publish message to the NFV fault management apparatus 1000, and receives the fault publish message sent by any node in the NFV system, where the fault publish message includes: a grouping identifier of the fault publish node, a node identifier of the fault publish node, a fault type, and/or fault content, and/or a fault priority. Meanings of the parameters are the same as those of the parameters described above. The fault publish message may further include a fault occurrence time.

As shown in FIG. 4, a fault publish node hypervisor publishes, to the NFV fault management apparatus 1000, fault information having a grouping identifier of the fault publish node of a group 3, a node identifier of the fault publish node of ID6, a fault type of B1, fault content of C2, and a fault occurrence time of a time 6; a fault publish node of a hardware resource publishes, to the NFV fault management apparatus 1000, fault information having a grouping identifier of the fault publish node of a group 2, a node identifier of the fault publish node of ID2, a fault type of B1, fault content of B2, and a fault occurrence time of a time 7, where as shown in FIG. 2, the hardware resource in the NFVI includes: computing hardware, storage hardware, and network hardware; a fault publish node: virtual machine (VM) publishes, to the NFV fault management apparatus 1000, fault information having a grouping identifier of the fault publish node of a group 1, a node identifier of the fault publish node of ID3, a fault type of A1, fault content of A2, and a fault occurrence time of a time 8.

It should be noted that even though each node may make a request to the NFV fault management apparatus to subscribe to and publish a fault message, and each node may also receive fault information notified by the NFV fault management apparatus, not each node needs to have the three functions: subscribing to, publishing, and receiving a notification, for example, a bottom-level storage node of NFV needs only a publishing function; for example, because an OSS node does not need to publish fault information of the OSS node to another node, the OSS node does not need a fault information publishing function.

Step S103: Perform matching between the fault information to which a subscription is requested and the fault publish message, and generate a fault notification message.

The NFV fault management apparatus receives fault subscription messages of one or more subscription nodes, also receives fault publish messages of one or more fault publish nodes, where parameters included in a fault message to which a subscription is requested and the fault publish message are consistent, and generates the fault notification message by performing matching between the parameters of the fault subscription message and the fault publish message, where the fault notification message includes: a node identifier of a subscription node, a grouping identifier of a fault publish node, a node identifier of the fault publish node, a fault type, and/or fault content, and/or a fault priority, and may further include a time for receiving the fault publish message and a time for notifying the fault information.

As shown in FIG. 4, the fault publish message includes the fault information to which a subscription is requested and that has the fault type of B1 and the fault content of C2, the fault type of B1 and the fault content of B2, and the fault type of A1 and the fault content of A2.

Step S104: Notify the fault notification message to a corresponding subscription node associated with the node identifier of the at least one subscription node.

After matching is performed between the parameters of the fault information to which a subscription is requested and the fault publish message, one or more fault notification messages are obtained, and the one or more fault notification messages are separately notified to a corresponding subscription node.

As shown in FIG. 4, the fault information having the fault type of A1 and the fault content of A2 is separately notified to the subscription nodes VIM and NFVO, the fault information having the fault type of B1 and the fault content of B2 is notified to the subscription node VNF, and the fault information having the fault type of B1 and the fault content of C2 is separately notified to the subscription nodes VNFM and NFVO.

As shown in FIG. 4, the fault publish message further includes a fault priority, for example, the fault information that is published by the fault publish node VNFM and that has the fault type of B1 and the fault content of C2 has a fault priority of 3, the fault information that is published by the fault publish node of the hardware resource and that has the fault type of B1 and the fault content of B2 has a fault priority of 2, and the fault information that is published by the fault publish node: virtual machine (VM) and that has the fault type of A1 and the fault content of A2 has a fault priority of 1; herein, it is considered by default that a descending order of the priorities is 1, 2, and 3.

The subscription nodes may be successively notified in the descending order of the fault priorities according to the fault priorities of the fault publish messages. As shown in FIG. 4, first, a fault notification message having a fault priority of 1, a fault type of A1, and fault content of A2 is notified to the subscription nodes VIM and NFVO; then, a fault notification message having a fault priority of 2, a fault type of B1, and fault content of B2 is notified to the subscription node VNF, and meanwhile, a fault notification message having a fault priority of 2, a fault type of B1, and fault content of C2 is notified to the subscription node VNFM; finally, a fault notification message having a fault priority of 3, a fault type of B1, and fault content of C2 is notified to the subscription node NFVO. Generally, a fault of a node at a lower level is more important and emergent, and has a higher requirement on delay performance.

If two or more subscription nodes request to subscribe to fault information having a same fault type and same fault content, fault notification messages having a same fault type and same fault content may be further notified to the two or more subscription nodes.

After receiving the fault notification messages, the subscription nodes start a fault processing mechanism.

It can be seen that, according to an NFV fault management method provided in this embodiment of the present invention, an NFV fault management apparatus disposed in an NFV system centrally receives a fault subscription message and a fault publish message of any node in the NFV system, performs matching between parameters of the received fault subscription message and fault publish message, and notifies a fault notification message to a corresponding node, which can implement real-time and quick location and notification of node fault information.

Figure 13:
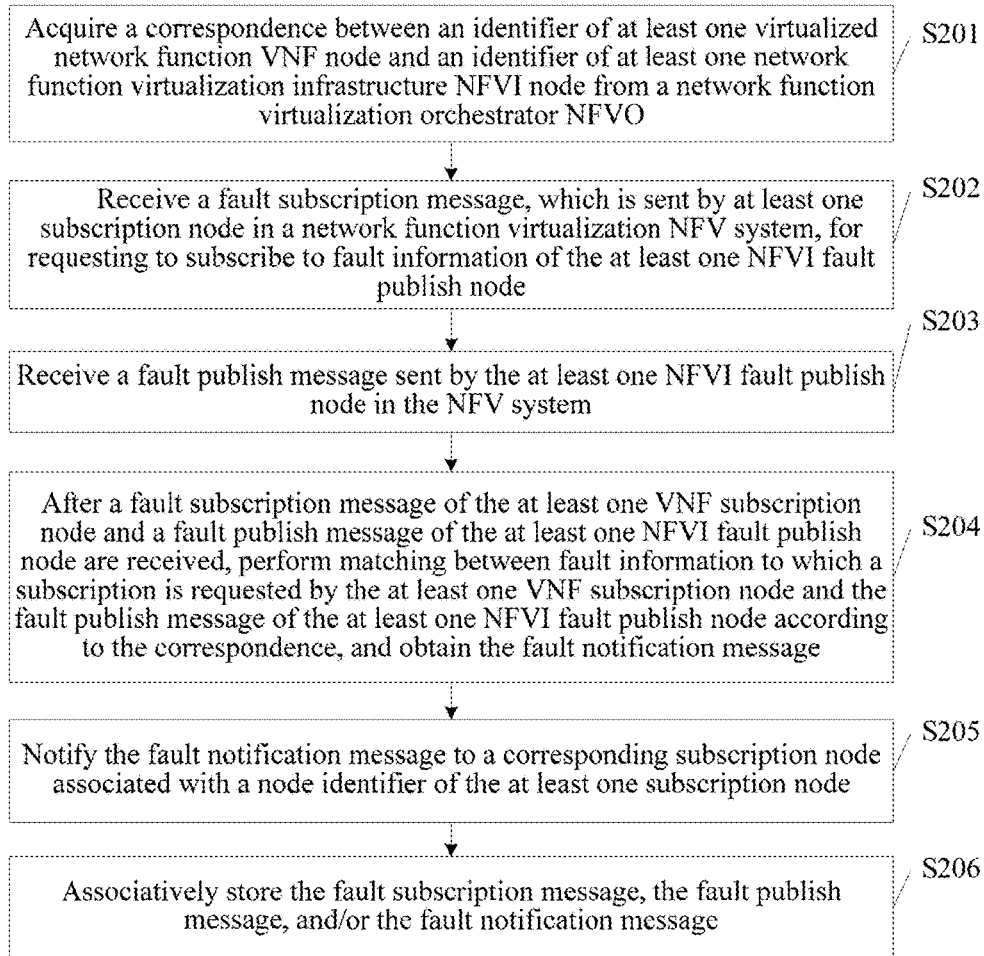
FIG. 13 is a flowchart of another NFV fault management method according to an embodiment of the present invention.

Refer to FIG. 13, which is a flowchart of another NFV fault management method according to an embodiment of the present invention. The method includes the following steps:

Step S201: Acquire a correspondence between an identifier of at least one virtualized network function VNF node and an identifier of at least one network function virtualization infrastructure NFVI node from a network function virtualization orchestrator NFVO.

A VNF node in an existing NFV system does not know a resource configuration situation of NFVI that corresponds to the VNF node. Therefore, the NFV fault management apparatus needs to store VNF information and NFVI resource configuration information that corresponds to the VNF information, that is, the correspondence between the identifier of the VNF node and the identifier of the NFVI node, that is, the system configures how many NFVI node resources for one VNF node.

The correspondence between the identifier of the VNF node and the identifier of the NFVI node may be acquired in six manners:

Manner 1: After instantiating a VNF, and updating a VNF catalog, an NFV service catalog, and a VNF instance by an NFVO, the NFVO sends a correspondence between a VNF node identifier and an NFVI resource configuration to the NFV fault management apparatus. The NFV fault management apparatus stores the correspondence between the VNF node identifier and the NFVI resource configuration, and the correspondence is used by the NFV fault management apparatus to perform processing of matching between fault messages.

Manner 2: In a case in which load of a VNF increases or load of a VNF gradually decreases, to ensure that resources are effectively used, the NFV system may start a VNF scaling process, to increase or decrease resources used by the VNF. After a VNF instance scaling down/VNF instance scaling up process is completed, after the NFVO updates a VNF catalog, an NFV service catalog, and a VNF instance, the NFVO sends a correspondence between a VNF node identifier and an NFVI resource configuration to the NFV fault management apparatus. The NFV fault management apparatus stores the correspondence between the VNF node identifier and the NFVI resource configuration, and the correspondence is used by the NFV fault management apparatus to perform processing of matching between fault messages.

Manner 3: After a fault subscription message of NFV is received, the NFV fault management apparatus may request a correspondence between a VNF node identifier and an NFVI resource configuration from an NFVO.

Manner 4: After a fault subscription message of NFV is received, the NFV fault management apparatus may request a correspondence between a VNF node identifier and an NFVI resource configuration from a VNF instance database and/or an NFVI resource configuration database.

Manner 5: A VNF may acquire information about a corresponding VM, and in a fault subscription message of NFV, the VNF sends a correspondence between the VNF and the VM to the NFV fault management apparatus. After the fault subscription message of the VNF is received, the NFV fault management apparatus may request a correspondence between the VM and an NFVI resource configuration from a VIM or a Hypervisor. The NFV fault management apparatus stores the correspondence between a VNF node identifier and the VM, the correspondence between the VM and the NFVI resource configuration, and a correspondence between the VNF node identifier and the NFVI resource configuration with reference to the foregoing information, and the correspondences are used by the NFV fault management apparatus to perform processing of matching between fault messages.

Manner 6: After a fault subscription message of NFV is received, the NFV fault management apparatus may request a correspondence between a VNF and a VM from a VNFM, and request a correspondence between the VM and an NFVI resource configuration from the VIM or a Hypervisor. The NFV fault management apparatus stores a correspondence between a VNF node identifier and the VM, the correspondence between the VM and the NFVI resource configuration, and a correspondence between the VNF node identifier and the NFVI resource configuration with reference to the foregoing information, and the correspondences are used by the NFV fault management apparatus to perform processing of matching between fault messages.

Step S202: Receive a fault subscription message, which is sent by at least one subscription node in an NFV system, for requesting to subscribe to fault information of the at least one NFVI fault publish node.

Step S202 is the same as step S101 in the foregoing embodiment, and a difference is that in this embodiment, any subscription node in the NFV system requests to subscribe to fault information of each node in the NFVI, that is, the NFV fault management apparatus in this embodiment manages a fault of each node in the NFVI. A fault message of each fault publish node in the NFVI is collected, and a subscription and notification function of the fault message of each fault publish node in the NFVI is provided for an upper-level subscription node of the NFVI.

Step S203: Receive a fault publish message sent by the at least one NFVI fault publish node in the NFV system.

Step S203 is the same as step S102 in the foregoing embodiment, and a difference is that in this embodiment, a fault publish message sent by each fault publish node in the NFVI is received.

Step S204: After a fault subscription message of the at least one VNF subscription node and the fault publish message of the at least one NFVI fault publish node are received, perform matching between fault information to which a subscription is requested by the at least one VNF subscription node and the fault publish message of the at least one NFVI fault publish node according to the correspondence, and generate the fault notification message.

Step S204 is the same as step S103 in the foregoing embodiment, and a difference is that different from that other upper-level management nodes such as a VNFM, an OSS/BSS, and a VIM already know a relationship between these upper-level management nodes and other nodes managed by these upper-level management nodes, in this embodiment, a VNF subscription node subscribes to the fault message of the fault publish node in the NFVI, and after the fault message published by each fault publish node in the NFVI is received, needs to learn, according to an acquired correspondence between the identifier of the VNF subscription node and the identifier of the NFVI fault publish node, that fault information published by the NFVI fault publish node should correspond to an identifier of which VNF subscription node.

Optionally, step S204 may also be:

after a fault subscription message of the at least one VNF subscription node and a fault publish message of at least one hardware resource node or virtualization management program hypervisor or virtual machine Virtual Machine in the NFVI are received, performing matching between fault information to which a subscription is requested by the at least one VNF subscription node and the fault publish message of the at least one hardware resource node or virtualization management program or virtual machine according to the correspondence, and generating the fault notification message.

Specifically, in the NFVI, the virtual resource node includes the virtual machine and/or the virtualization management program, where the virtual machine includes a virtual computing node, a virtual storage node, and a virtual network node, and the hardware resource node includes a computing hardware node, a storage hardware node, and a network hardware node. The NFV fault management apparatus is disposed in any one or each virtual resource node in the NFVI, so that the NFV fault management apparatus is configured to receive the fault subscription message of the VNF subscription node, and receive fault publish messages of the one or more hardware resource nodes or virtual machines or virtualization management programs in the NFVI, perform matching between the fault information to which a subscription is requested by the VNF subscription node and the fault publish message of the hardware resource node or virtual machine or virtualization management program according to the correspondence between the identifier of the VNF node and an identifier of the hardware resource node or virtual machine or virtualization management program, and generate the fault notification message.

In the optional implementation manner, because SWA5 (vn-nF) is an interface between the VNF and the NFVI, in this implementation manner, the SWA5(vn-nF) interface needs to support a function that a VNF fault subscription node subscribes to fault information from the NFV fault management apparatus and a function that the NFV fault management apparatus notifies the fault information to the VNF fault subscription node.

Step S205: Notify the fault notification message to a corresponding subscription node associated with a node identifier of the at least one subscription node.

Step S205 is the same as step S104 in the foregoing embodiment, and is not described herein again.

Step S206: Associatively store the fault subscription message, the fault publish message, and/or the fault notification message.

For each fault subscription message and fault publish message, if matching is successfully performed, the fault subscription message, the fault publish message, and the fault notification message are associatively stored; if matching is not successfully performed, the fault subscription message and the fault publish message are still associatively stored, so as to facilitate subsequent querying, invoking and the like by the NFV system.

It can be seen that, according to an NFV fault management method provided in this embodiment of the present invention, an NFV fault management apparatus disposed in an NFV system centrally receives a fault subscription message and a fault publish message of any node in the NFV system, performs matching between parameters of the received fault subscription message and fault publish message, and notifies a fault notification message to a corresponding node, which can implement real-time and quick location and notification of node fault information.

Figure 14:
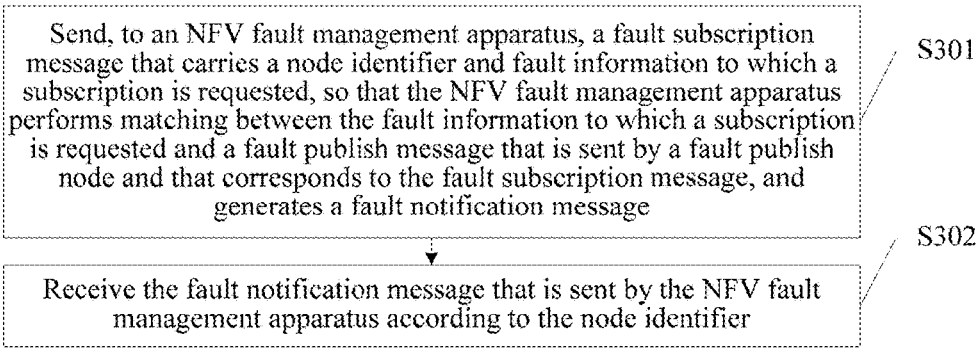
FIG. 14 is a flowchart of still another NFV fault management method according to an embodiment of the present invention.

Refer to FIG. 14, which is a flowchart of still another NFV fault management method according to an embodiment of the present invention. The method includes the following steps:

Step S301: Send, to an NFV fault management apparatus, a fault subscription message that carries a node identifier and fault information to which a subscription is requested, so that the NFV fault management apparatus performs matching between the fault information to which a subscription is requested and a fault publish message that is sent by a fault publish node and that corresponds to the fault subscription message, and generates a fault notification message.

The subscription node sends, to the NFV fault management apparatus, the fault subscription message that carries the node identifier and the fault information to which a subscription is requested, where the subscription node may be any node in an NFV system. The fault information to which a subscription is requested and the fault publish message may include: a grouping identifier of the fault publish node, a node identifier of the fault publish node, a fault type, and/or fault content, and/or a fault priority. For a specific format for sending a fault subscription message, reference may be made to the foregoing embodiment, and details are not described herein again.

Step S302: Receive the fault notification message that is sent by the NFV fault management apparatus according to the node identifier.

The fault notification message sent by the NFV fault management apparatus is received, where the fault notification message includes: a node identifier of a subscription node, a grouping identifier of the fault publish node, a node identifier of the fault publish node, a fault type, and/or fault content, and/or a fault priority, and may further include a time for receiving the fault publish message and a time for notifying the fault information. The NFV fault management apparatus sends, according to the node identifier, the fault notification message to an NFV subscription node that corresponds to the node identifier.

In an implementation manner, step S301 may be specifically:

sending, to the NFV fault management apparatus, a fault subscription message, which carries a node identifier of a VNF node, for requesting to subscribe to fault information of at least one network function virtualization infrastructure NFVI fault publish node, so that the NFV fault management apparatus performs, according to a correspondence between the node identifier of the VNF node and a node identifier of the at least one NFVI node, matching between the fault information, to which a subscription is requested, of the at least one NFVI node and a fault publish message sent by the at least one NFVI node, and generates the fault notification message.

The implementation manner is that the VNF subscription node subscribes to the fault publish message of the NFVI node. A VNF node in an existing NFV system does not know a resource configuration situation of NFVI that corresponds to the VNF node. Therefore, the NFV fault management apparatus needs to store VNF information and NFVI resource configuration information that corresponds to the VNF information, that is, a correspondence between the identifier of the VNF node and the identifier of the NFVI node. Then, that the VNF sends the fault subscription message and receives the fault notification message sent by the NFV fault management apparatus is the same as that in the foregoing embodiment, and is not described herein again.

The NFV fault management apparatus collects a fault message published by each fault publish node in the NFVI, and provides a subscription and notification function of the fault message of each fault publish node in the NFVI for an upper-level subscription node of the NFVI. The NFV fault management apparatus may be independently deployed, or may be deployed in the NFVI, or may be in a VIM, which is not limited in this embodiment of the present invention. In addition, the NFV fault management apparatus may also independently serve a VNF, and the NFV fault management apparatus is created while the VNF is created. If the VNF fails, the NFV fault management apparatus corresponding to the VNF fails simultaneously.

In another implementation manner, step S301 may be specifically:

sending, to the NFV fault management apparatus, a fault subscription message, which carries the node identifier of the VNF node, for requesting to subscribe to fault information of at least one hardware resource node or virtualization management program hypervisor or virtual machine Virtual Machine in the NFVI, so that the NFV fault management apparatus performs, according to a correspondence between the node identifier of the VNF node and a node identifier of the at least one hardware resource node or virtualization management program or virtual machine, matching between the fault information, to which a subscription is requested, of the at least one hardware resource node or virtualization management program or virtual machine and a fault publish message sent by the at least one hardware resource node or virtualization management program or virtual machine, and generates the fault notification message, where the NFV fault management apparatus is located in any virtual resource node in the NFVI, and the virtual resource node includes the virtualization management program and/or the virtual machine.

Specifically, in the NFVI, the virtual resource node includes the virtual machine and/or the virtualization management program, where the virtual machine includes a virtual computing node, a virtual storage node, and a virtual network node, and the hardware resource node includes a computing hardware node, a storage hardware node, and a network hardware node. The NFV fault management apparatus is disposed in any one or each virtual resource node in the NFVI, so that the NFV fault management apparatus is configured to receive the fault subscription message of the VNF subscription node, and receive the fault publish messages of the one or more hardware resource nodes or virtual machines or virtualization management programs in the NFVI, perform matching between the fault information to which a subscription is requested by the VNF subscription node and the fault publish message of the hardware resource node or virtual machine or virtualization management program according to the correspondence between the identifier of the VNF node and an identifier of the hardware resource node or virtual machine or virtualization management program, and generate the fault notification message.

Specifically, SWA5(vn-nF) is an interface between the VNF and the NFVI, and a VNF subscription node sends the fault subscription message to the NFV fault management apparatus by using the interface, and receives, by using the interface, the fault notification message sent by the NFV fault management apparatus.

It can be seen that, according to an NFV fault management method provided in this embodiment of the present invention, an NFV fault management apparatus disposed in an NFV system centrally receives a fault subscription message and a fault publish message of any node in the NFV system, performs matching between parameters of the received fault subscription message and fault publish message, and notifies a fault notification message to a corresponding node, which can implement real-time and quick location and notification of node fault information.

An embodiment of the present invention further provides an NFV fault management method, where the method includes a step:

sending a fault publish message to an NFV fault management apparatus, so that the NFV fault management apparatus performs matching between fault information to which a subscription is requested and that is received from a subscription node and the fault publish message, generates a fault notification message, and notifies the fault notification message to the subscription node, where the fault information to which a subscription is requested and the fault publish message include: a grouping identifier of a fault publish node, a node identifier of the fault publish node, a fault type, and/or fault content, and/or a fault priority.

The fault publish node sends the fault publish message to the NFV fault management apparatus, where the fault publish message sent by the fault publish node includes: a grouping identifier of a fault publish node, a node identifier of the fault publish node, a fault type, and/or fault content, and/or a fault priority, and a parameter included in the fault information to which a subscription is requested is consistent with that included in the fault publish message. For a format for sending the fault publish message by the fault publish node to the NFV fault management apparatus, reference may be made to the foregoing embodiment, and details are not described herein again.

It can be seen that, according to an NFV fault management method provided in this embodiment of the present invention, an NFV fault management apparatus disposed in an NFV system centrally receives a fault subscription message and a fault publish message of any node in the NFV system, performs matching between parameters of the received fault subscription message and fault publish message, and notifies a fault notification message to a corresponding node, which can implement real-time and quick location and notification of node fault information.

It should be noted that, for ease of description, the foregoing method embodiments are described as a series of action combinations. However, a person skilled in the art should understand that the present invention is not limited to the described sequence of the actions, because some steps may be performed in another sequence or performed at the same time according to the present invention. In addition, a person skilled in the art should also understand that all the embodiments described in this specification belong to exemplary embodiments, and the involved actions and modules are not necessarily mandatory to the present invention.

In the foregoing embodiments, the description of each embodiment has respective focuses. For a part that is not described in detail in an embodiment, reference may be made to related descriptions in other embodiments.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a random access memory (RAM), a read-only memory (ROM), an electrically erasable programmable read-only memory (EEPROM), a compact disc read-only memory (CD-ROM), or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in a definition of a medium to which they belong. For example, a disk (and disc used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A network function virtualization (NFV) fault management device, comprising:
   a non-transitory memory storing instructions; and
   a processor in communication with the memory, wherein the processor executes the instructions to cause the NFV fault management device to perform the following steps:
   receiving a fault subscription message from a subscription node in an NFV system, wherein the fault subscription message comprises fault information to which a subscription is requested by the subscription node;
   receiving a fault publish message from a fault publish node in the NFV system;
   generating a fault notification message according to the fault subscription message and the fault publish message; and
   notifying the fault notification message to the subscription nod;
   wherein the fault information to which the subscription is requested comprises at least one of: a grouping identifier of the fault publish node, a node identifier of the fault publish node, a fault type, fault content, and a fault priority, and
   wherein the step of notifying the fault notification message comprises:
   when at least one of fault types and fault content to which a subscription is requested by at least two subscription nodes is the same, simultaneously notifying the fault notification message to the at least two subscription nodes.

2. The device according to claim 1, wherein the fault publish message comprises a fault type.

3. The device according to claim 1, wherein the step of notifying the fault notification message comprises:
   successively notifying, according to the fault priority, the fault notification message to a plurality of subscription nodes which comprises the subscription node.

4. The device according to claim 1, wherein the processor further executes the instructions to cause the NFV fault management device to perform the following step:
   associatively storing at least one of the fault subscription message, the fault publish message, and the fault notification message.

5. The device according to claim 1, wherein the processor further executes the instructions to cause the NFV fault management device to perform the following step:
   acquiring a correspondence between an identifier of a virtualized network function (VNF) subscription node and an identifier of a fault publish network function virtualization infrastructure (NFVI) from a network function virtualization orchestrator (NFVO).

6. The device according to claim 5, wherein the fault subscription message comprises a first fault subscription message, which is sent by the VNF subscription node, for requesting to subscribe to fault information of the fault publish NFVI, and wherein the fault publish message comprises a first fault publish message sent by the fault publish NFVI.

7. The device according to claim 6, wherein the step of notifying the fault notification message comprises:
   after the first fault subscription message and the first fault publish message are received, performing matching between the fault information to which the subscription is requested by the VNF subscription node and the first fault publish message according to the correspondence, to generate the fault notification message.

8. The device according to claim 1, wherein the step of generating the fault notification message comprises:
   performing matching between the fault information to which the subscription is requested by the subscription node and the fault publish message, to generate the fault notification message.

9. A network function virtualization (NFV) fault management method, comprising:
   receiving a fault subscription message from a subscription node in an NFV system, wherein the fault subscription message comprises fault information to which a subscription is requested by the subscription node;
   receiving a fault publish message from a fault publish node in the NFV system;

generating a fault notification message according to the fault subscription message and the fault publish message; and notifying the fault notification message to the subscription node, wherein the fault information to which the subscription is requested comprises at least one of: a grouping identifier of the fault publish node, a node identifier of the fault publish node, a fault type, fault content, and a fault priority, and wherein notifying the fault notification message comprises:

when at least one of fault types and fault content to which a subscription is requested by at least two subscription nodes is the same, simultaneously notifying the fault notification message to the at least two subscription nodes.

10. The method according to claim 9, wherein the fault publish message comprises a fault type.

11. The method according to claim 9, wherein notifying the fault notification message comprises:

successively notifying, according to the fault priority, the fault notification message to a plurality of subscription nodes which comprises the subscription node.

12. The method according to claim 9, further comprising:

associatively storing at least one of the fault subscription message, the fault publish message, and the fault notification message.

13. The method according to claim 9, further comprising:

acquiring a correspondence between an identifier of a virtualized network function (VNF) subscription node and an identifier of a fault publish network function virtualization infrastructure (NFVI) from a network function virtualization orchestrator (NFVO).

14. The method according to claim 13, wherein the fault subscription message comprises a first fault subscription message, which is sent by the VNF subscription node, for requesting to subscribe to fault information of the fault publish NFVI, and wherein the fault publish message comprises a first fault publish message sent by the fault publish NFVI.

15. The method according to claim 14, wherein notifying the fault notification message comprises:

after the first fault subscription message and the first fault publish message are received, performing matching between the fault information to which the subscription is requested by the VNF subscription node and the first fault publish message according to the correspondence, to generate the fault notification message.

16. A non-transitory computer readable medium, comprising:

a computer program code comprising one or more executable instructions, which, when executed by a network function virtualization (NFV) fault management device, cause the NFV fault management device to perform a method comprising:

receiving a fault subscription message from a subscription node in an NFV system, wherein the fault subscription message comprises fault information to which a subscription is requested by the subscription node;

receiving a fault publish message from a fault publish node in the NFV system;

generating a fault notification message according to the fault subscription message and the fault publish message; and notifying the fault notification message to the subscription node, wherein the fault information to which the subscription is requested comprises at least one of: a grouping identifier of the fault publish node, a node identifier of the fault publish node, a fault type, fault content, and a fault priority, and wherein notifying the fault notification message comprises:

when at least one of fault types and fault content to which a subscription is requested by at least two subscription nodes is the same, simultaneously notifying the fault notification message to the at least two subscription nodes.

* * * * *

UNITED STATES PATENT AND TRADEMARK OFFICE
CERTIFICATE OF CORRECTION

PATENT NO. : 10,313,183 B2
APPLICATION NO. : 15/197114
DATED : June 4, 2019
INVENTOR(S) : Wei et al.

Page 1 of 1

It is certified that error appears in the above-identified patent and that said Letters Patent is hereby corrected as shown below:

In the Claims

Claim 1, Column 40, Line 5, "nod" should read -- node --.

Signed and Sealed this
Eighteenth Day of February, 2020

Andrei Iancu
*Director of the United States Patent and Trademark Office*